(12) United States Patent
Kim et al.

(10) Patent No.: US 10,141,979 B2
(45) Date of Patent: Nov. 27, 2018

(54) APPARATUS AND METHOD FOR USING NEAR FIELD COMMUNICATION AND WIRELESS POWER TRANSMISSION

(71) Applicant: Samsung Electronics Co., Ltd., Suwon-si (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Yun Kwon Park, Dongducheon-si (KR); Eun Seok Park, Yongin-si (KR); Young Ho Ryu, Yongin-si (KR); Chang Wook Yoon, Seoul (KR); Jin Sung Choi, Gimpo-si (KR); Young-tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/673,116

(22) Filed: Aug. 9, 2017

(65) Prior Publication Data
US 2017/0338861 A1   Nov. 23, 2017

Related U.S. Application Data

(63) Continuation of application No. 14/708,844, filed on May 11, 2015, now Pat. No. 9,742,473, which is a
(Continued)

(30) Foreign Application Priority Data

May 17, 2011   (KR) .................. 10-2011-0046186
Apr. 2, 2012   (KR) .................. 10-2012-0033915

(51) Int. Cl.
*H04B 5/00*   (2006.01)

(52) U.S. Cl.
CPC ......... *H04B 5/0037* (2013.01); *H04B 5/0031* (2013.01); *H04B 5/0081* (2013.01)

(58) Field of Classification Search
CPC ... H04B 5/0037; H04B 5/0031; H04B 5/0081
See application file for complete search history.

(56) References Cited

U.S. PATENT DOCUMENTS 7,912,441 B2   3/2011   Von Bosch
9,030,052 B2   5/2015   Kim et al.
(Continued)

FOREIGN PATENT DOCUMENTS

EP   1 816 581 A1   8/2007
JP   2008-77554 A   4/2008
(Continued)

*Primary Examiner* — Robert Deberadinis
(74) *Attorney, Agent, or Firm* — NSIP Law

(57) ABSTRACT

An apparatus and method of using near field communication (NFC) and wireless power transmission (WPT) are provided. A power receiving apparatus includes a resonator configured to receive a power and to output the power. The power receiving apparatus further includes a near field communication (NFC) receiver configured to perform wireless communication using the power output by the resonator. The power receiving apparatus further includes a wireless power transmission (WPT) receiver configured to supply a voltage using the power output by the resonator. The power receiving apparatus further includes a connecting unit configured to selectively connect the resonator to either the NFC receiver or the WPT receiver. The power receiving apparatus further includes a mode selector configured to control the connecting unit to selectively connect the resonator to either the NFC receiver or the WPT receiver based on the power output by the resonator.

20 Claims, 22 Drawing Sheets

Related U.S. Application Data continuation of application No. 13/471,702, filed on May 15, 2012, now Pat. No. 9,030,052.

(56) References Cited

U.S. PATENT DOCUMENTS

2009/0291634 A1 11/2009 Saarisalo
2010/0207575 A1 8/2010 Pijnenburg et al.

FOREIGN PATENT DOCUMENTS

| KR | 10-0564256 B1 | 12/2006 |
| KR | 10-0737560 B1 | 7/2007 |
| KR | 10-2009-0100652 A | 9/2009 |

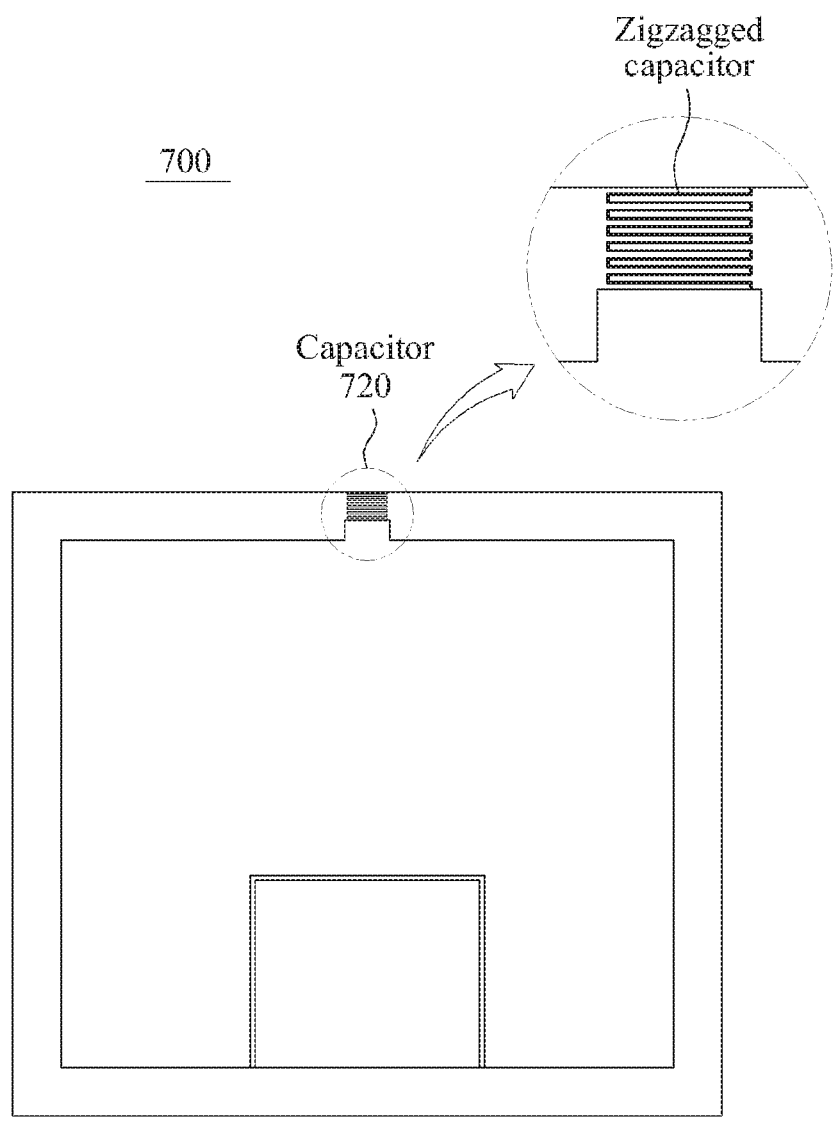

APPARATUS AND METHOD FOR USING NEAR FIELD COMMUNICATION AND WIRELESS POWER TRANSMISSION

CROSS-REFERENCE TO RELATED APPLICATION(S)

This present application is a continuation of U.S. patent application Ser. No. 14/708,844, filed May 11, 2015, which is a continuation of U.S. application Ser. No. 13/471,702, filed May 15, 2012, which claims the benefit under 35 U.S.C. § 119(a) of Korean Patent Application No. 10-2011-0046186, filed on May 17, 2011, and Korean Patent Application No. 10-2012-0033915, filed on Apr. 2, 2012, in the Korean Intellectual Property Office, the entire disclosures of which are each incorporated herein by reference for all purposes.

BACKGROUND

1. Field

The following description relates to an apparatus and method of using near field communication (NFC) and wireless power transmission (WPT), and more particularly, to an apparatus and method of providing NFC and WPT.

2. Description of Related Art

Wireless power refers to energy that is transferred from a wireless power transmitter to a wireless power receiver via magnetic coupling. The wireless power receiver may charge a battery using the received energy. A wireless power transmission and charging system includes a source device and a target device. The source device may wirelessly transmit power, and the target device may wirelessly receive power. In other words, the source device may be referred to as a wireless power transmitter, and the target device may be referred to as a wireless power receiver.

In wireless power transmission (WPT) employing a resonance coupling, a high degree of freedom may be provided in a position of the source device and a position of the target device. The source device includes a source resonator, and the target device includes a target resonator. For example, magnetic coupling or resonance coupling may be formed between the source resonator and the target resonator to transfer power. In addition, the source device and the target device may communicate with each other. During communications, the transmission or reception of control and state information may occur.

As mobile devices (e.g., smartphones) become widespread, new functions may be added to these mobile devices, to provide a wider variety of new services. For example, the new functions may include near field communication (NFC), which refers to a short-range wireless communication technology. The NFC may enable devices within, for example, about 10 centimeters (cm) to communicate with each other.

Further, the NFC may interoperate with an application of a mobile device to provide services, for example, an electronic payment system. Accordingly, a high-end mobile device may need to include an NFC function. As such, there may be a demand for a mobile device to include an NFC function and an WPT function.

SUMMARY

In one general aspect, there is provided a power receiving apparatus including a resonator configured to receive a power and to output the power. The power receiving apparatus further includes a near field communication (NFC) receiver configured to perform wireless communication using the power output by the resonator. The power receiving apparatus further includes a wireless power transmission (WPT) receiver configured to supply a voltage using the power output by the resonator. The power receiving apparatus further includes a connecting unit configured to selectively connect the resonator to either the NFC receiver or the WPT receiver. The power receiving apparatus further includes a mode selector configured to control the connecting unit to selectively connect the resonator to either the NFC receiver or the WPT receiver based on the power output by the resonator.

The power receiving apparatus is configured to operate on the voltage.

The resonator has a resonance frequency of 13.56 megahertz (MHz), and a Q-factor exceeding 100.

The power receiving apparatus further includes a loss matching circuit connected between the NFC receiver and the connecting unit, and configured to perform loss matching to enable the NFC receiver to enter a low-Q state.

The mode selector is further configured to determine an operating mode of the power receiving apparatus based on the power output by the resonator, and control the connecting unit to selectively connect the resonator to either the NFC receiver or the WPT receiver based on the operating mode.

The mode selector is further configured to control the connecting unit to connect the resonator to the NFC receiver when the power output by the resonator is less than a maximum NFC output power, and control the connecting unit to connect the resonator to the WPT receiver when the power output by the resonator is greater than the maximum NFC output power.

The connecting unit includes a first switch configured to selectively connect and disconnect the resonator to and from the NFC receiver, and a second switch configured to selectively connect and disconnect the resonator to and from the WPT receiver. The mode selector is further configured to control the first switch and the second switch to selectively connect the resonator to either the NFC receiver or the WPT receiver.

The mode selector is further configured to output a switch control signal to the first switch and the second switch to selectively turn the first switch on and the second switch off, or to turn the first switch off and the second switch on.

The mode selector is further configured to generate the switch control signal to turn the first switch on to connect the resonator to the NFC receiver and to turn the second switch off to disconnect the resonator from the WPT receiver when the power output by the resonator is less than a maximum NFC output power, and generate the switch control signal to turn the first switch off to disconnect the resonator from the NFC receiver and to turn the second switch on to connect the resonator to the WPT receiver when the power output by the resonator is greater than the maximum NFC output power.

The mode selector includes a rectifier and a capacitor configured to receive the power output by the resonator and to supply a power voltage indicative of the power output by the resonator. The mode selector further includes a low dropout (LDO) regulator configured to supply a predetermined applied voltage. The mode selector further includes a comparator configured to compare the power voltage with the applied voltage, output a switch control signal to control the connecting unit to connect the resonator to the NFC receiver when the power voltage is less than the applied voltage, and output the switch control signal to control the connecting unit to connect the resonator to the WPT receiver when the power voltage is greater than the applied voltage.

The comparator includes a negative input terminal and a positive input terminal. The mode selector further includes a first voltage divider configured to divide the applied voltage to generate a reference voltage indicative of a maximum NFC output power, and to supply the reference voltage to the negative input terminal of the comparator. The mode selector further includes a second voltage divider configured to divide the power voltage to generate an input voltage indicative of the power output by the resonator, and to supply the input voltage to the positive input terminal of the comparator.

The comparator includes an output terminal configured to output the switch control signal. The mode selector further includes a resistor connected to ground and to the output terminal of the comparator.

In another general aspect, there is provided a method of operating a power receiving apparatus, including connecting a resonator to either a near field communication (NFC) receiver or a wireless power transmission (WPT) receiver based on a power received by the resonator. The method further includes using the NFC receiver to perform wireless communication using the power when the resonator is connected to the NFC receiver. The method further includes using the WPT receiver to supplying a voltage using the power when the resonator is connected to the WPT receiver.

The connecting includes comparing the power with a predetermined power, connecting the resonator to the NFC receiver and disconnecting the resonator from the WPT receiver when the power is less than the predetermined power, and disconnecting the resonator from the NFC receiver and connecting the resonator to the WPT receiver when the power is greater than the predetermined power.

A non-transitory computer-readable storage medium stores a program including instructions to cause a computer to implement the method.

In still another general aspect, there is provided a power receiving apparatus including a near field communication (NFC) resonator configured to receive a first power and output the first power. The power receiving apparatus further includes an NFC receiver configured to perform wireless communication using the first power output by the NFC resonator. The power receiving apparatus further includes a wireless power transmission (WPT) resonator configured to receive a second power and output the second power. The power receiving apparatus further includes an WPT receiver configured to supply a voltage using the second power output by the WPT resonator. A resonance frequency of the NFC resonator is different from a resonance frequency of the WPT resonator.

The power receiving apparatus is configured to operate on the voltage.

The NFC resonator is disposed within the WPT resonator.

In yet another general aspect, there is provided a method of operating a power receiving apparatus, including using a near field communication (NFC) receiver to perform wireless communication using a first power received by an NFC resonator. The method further includes using a wireless power transmission (WPT) receiver to supply a voltage using a second power received by a WPT resonator. A resonance frequency of the NFC resonator is different from a resonance frequency of the WPT resonator.

The NFC resonator is disposed within the WPT resonator.

Other features and aspects may be apparent from the following detailed description, the drawings, and the claims.

BRIEF DESCRIPTION OF THE DRAWINGS

FIGS. 2 through 8B are diagrams illustrating examples of resonators.

Figure 1:
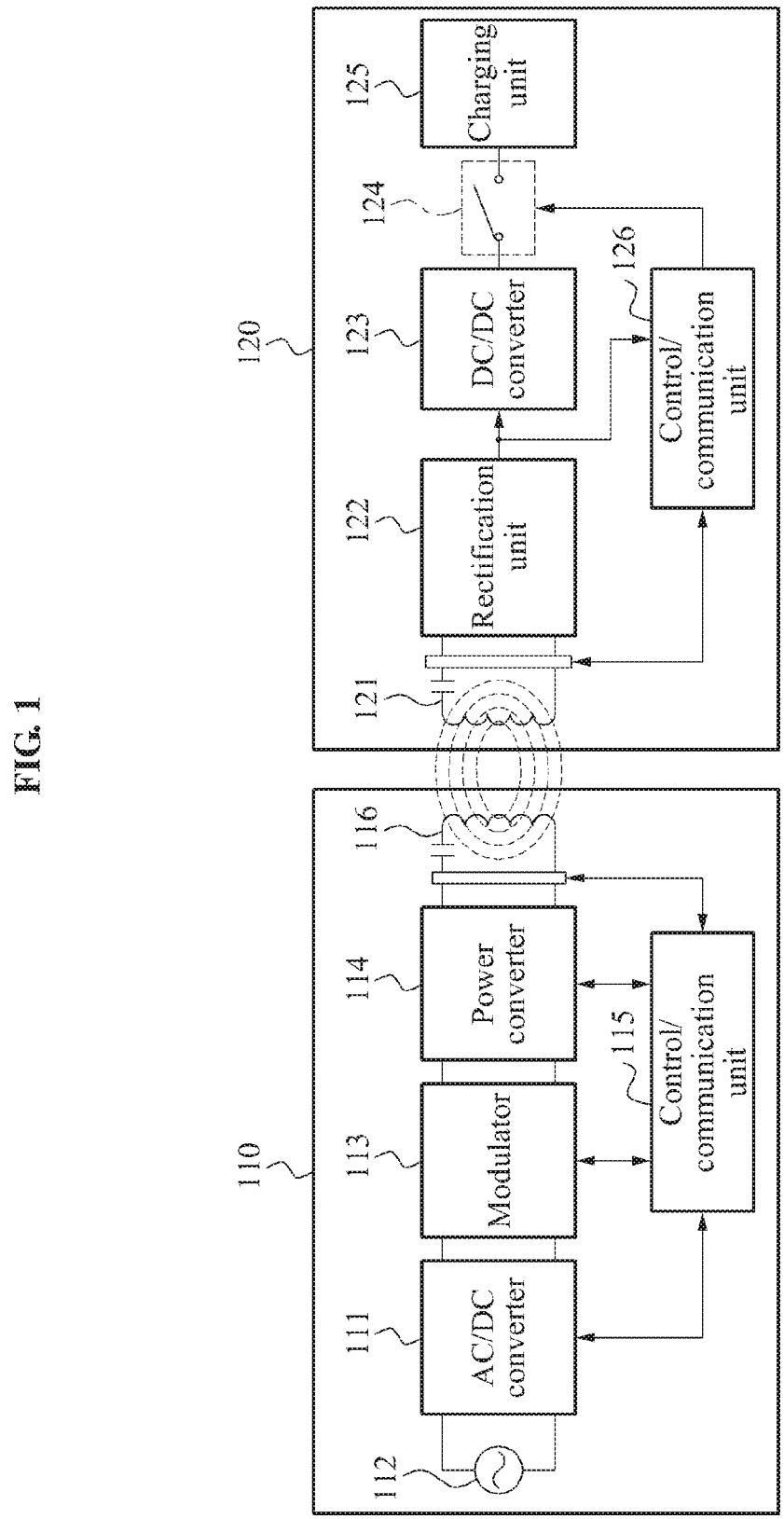
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission and charging system. The wireless power transmission and charging system includes a source device 110 and a target device 120.

The source device 110 includes an alternating current-to-direct current (AC/DC) converter 111, a resonance frequency generator 112, a modulator 113, a power converter 114, a control/communication unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 rectifies an AC voltage in a band of tens of hertz (Hz) to generate a DC voltage. The AC/DC converter 111 outputs the DC voltage of a predetermined level, or adjusts an output level of the DC voltage based on control of the control/communication unit 115.

The resonance frequency generator 112 generates a switching pulse signal in a band of a few megahertz (MHz) to tens of MHz. A frequency of the switching pulse signal may be a resonance frequency. The switching pulse signal output from the resonance frequency generator 112 is turned on or off via the modulator 113.

The modulator 113 generates a modulation signal under the control of the control/communication unit 115. For example, the modulator 113 may use various schemes to generate the modulation signal for in-band communication. The modulator 113 may turn on or off the switching pulse signal output from the resonance frequency generator 112 to generate the modulation signal. Additionally, the modulator 113 may perform delta-sigma modulation to generate the modulation signal. Furthermore, the modulator 113 may generate a pulse-width modulation (PWM) signal with a predetermined envelope.

The power converter 114 converts the DC voltage into an AC voltage, using the switching pulse signal, to generate a power. As an example, the power converter 114 may use the resonance frequency to convert DC voltage to AC voltage, and may generate a communication power used for communication or a charging power used to charge. The communication power and the charging power may be used in the target device 120. The communication power and the charging power will be further described with reference to FIG. 3.

The control/communication unit 115 controls the frequency of the switching pulse signal. The frequency of the switching pulse signal is determined under the control of the control/communication unit 115. The control/communication unit 115 controls the modulator 113 to generate the modulation signal to be transmitted to the target device 120. In other words, the control/communication unit 115 may use in-band communication to transmit various messages to the target device 120. Additionally, the control/communication unit 115 may detect a reflected wave, and may demodulate a signal received from the target device 120 through an envelope of the detected reflected wave.

The source resonator 116 transfers an electromagnetic energy to the target resonator 121. As an example, the source resonator 116 transfers the communication power and/or the charging power to the target device 120, using a magnetic coupling with the target resonator 121.

The target resonator 121 receives the electromagnetic energy from the source resonator 116. As an example, the target resonator 121 receives the communication power and/or the charging power from the source device 110, using the magnetic coupling with the source resonator 116. As another example, the target resonator 121 may use the in-band communication to receive various messages from the source device 110.

The rectification unit 122 rectifies an AC voltage to generate a DC voltage. In this example, the AC voltage is received from the target resonator 121.

The DC/DC converter 123 adjusts a level of the DC voltage output from the rectification unit 122 based on a capacity of the charging unit 125. For example, the DC/DC converter 123 may adjust to, for example, 3 volt (V) to 10 V, the level of the DC voltage output from the rectification unit 122.

The switch unit 124 is turned on or off under control of the control/communication unit 126. For example, when the switch unit 124 is turned off, the control/communication unit 115 of the source device 110 detects a reflected wave. In other words, in response to the switch unit 124 being turned off, the magnetic coupling between the source resonator 116 and the target resonator 121 is substantially reduced.

The charging unit 125 may include, for example, a battery. The charging unit 125 may charge the battery using the DC voltage output from the DC/DC converter 123.

The control/communication unit 126 may perform in-band communication to transmit and/or receive data using the resonance frequency. During the in-band communication, the control/communication unit 126 may detect a signal between the target resonator 121 and the rectification unit 122, or an output signal of the rectification unit 122, and may demodulate the detected signal. In other words, the control/communication unit 126 may demodulate a message received using the in-band communication.

Additionally, the control/communication unit 126 may adjust an impedance of the target resonator 121 to modulate a signal to be transmitted to the source device 110. Furthermore, the control/communication unit 126 may turn on or off the switch unit 124 to modulate the signal to be transmitted to the source device 110. For example, the control/communication unit 126 may increase the impedance of the target resonator 121 so that the control/communication unit 115 of the source device 110 may detect a reflected wave. In this example, depending on whether the reflected wave is detected, the control/communication unit 115 may detect a binary number "0" or "1". The control/communication unit 126 may transmit, to the source device 110, a response message in response to a message received from the source device 110, using a shortened packet obtained by converting a byte scale of a general packet to a bit scale.

Figure 2:
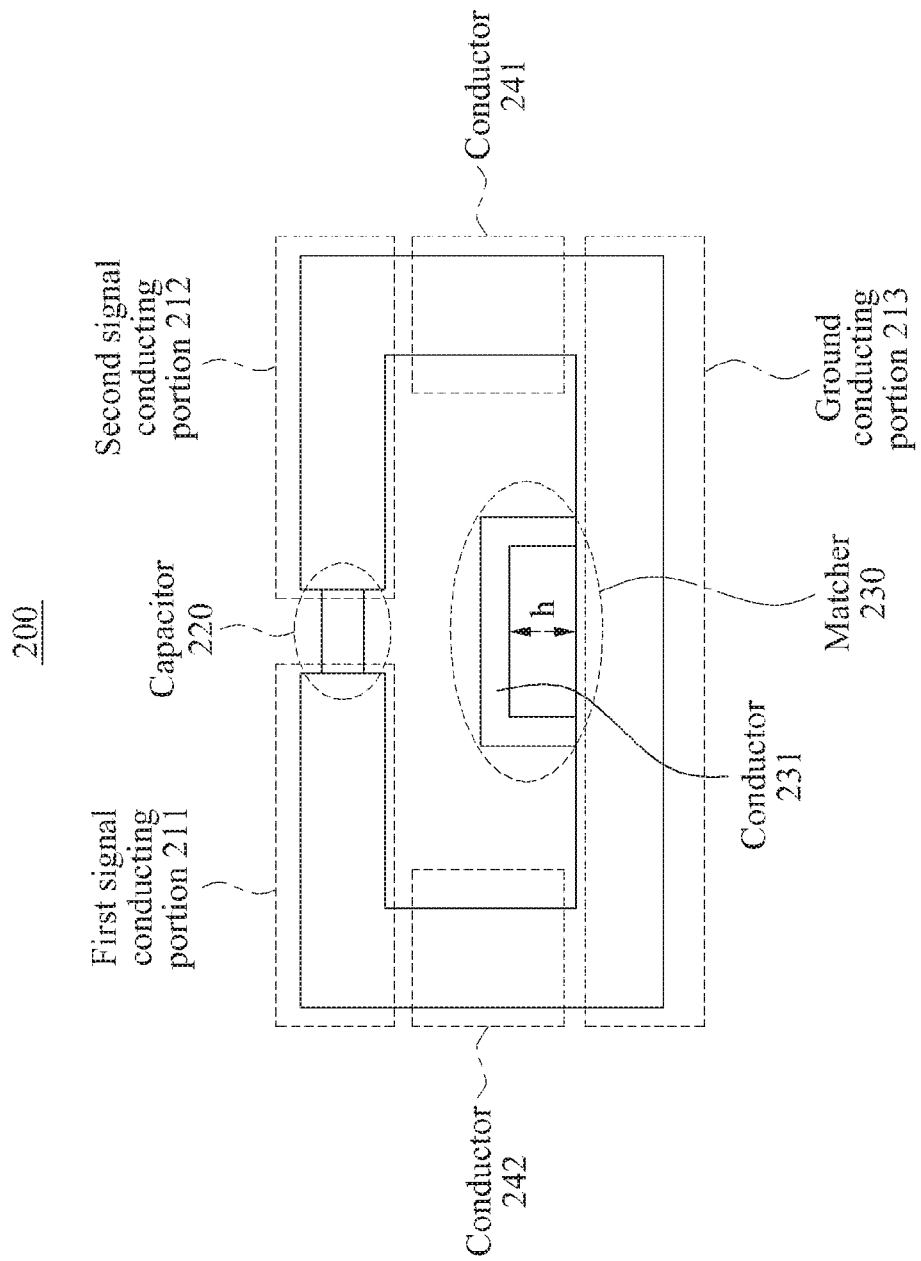

FIGS. 2 through 8B illustrate examples of resonators. In more detail, FIG. 2 illustrates an example of a resonator 200 including a two-dimensional (2D) structure.

The resonator 200 includes a transmission line, a capacitor 220, a matcher 230, and conductors 241 and 242. The transmission line includes a first signal conducting portion 211, a second signal conducting portion 212, and a ground conducting portion 213.

The capacitor 220 is inserted in series between the first signal conducting portion 211 and the second signal conducting portion 212. Thus, an electric field is confined within the capacitor 220. The transmission line may include at least one conductor in an upper portion of the transmission line, and may also include at least one conductor in a lower portion of the transmission line. Current may flow through the conductor disposed in the upper portion of the transmission line, and the conductor disposed in the lower portion of the transmission may be electrically grounded. For example, a conductor disposed in the upper portion of the transmission line is separated and thereby referred to as the first signal conducting portion 211 and the second signal conducting portion 212. A conductor disposed in the lower portion of the transmission line is referred to as the ground conducting portion 213.

That is, the transmission line includes the first signal conducting portion 211 and the second signal conducting portion 212 in the upper portion of the transmission line, and includes the ground conducting portion 213 in the lower portion of the transmission line. The first signal conducting portion 211 and the second signal conducting portion 212 face the ground conducting portion 213. The current flows through the first signal conducting portion 211 and the second signal conducting portion 212.

One end of the first signal conducting portion 211 is shorted to the conductor 242, and another end of the first signal conducting portion 211 is connected to the capacitor 220. One end of the second signal conducting portion 212 is shorted to the conductor 241, and another end of the second signal conducting portion 212 is connected to the capacitor 220. Accordingly, the first signal conducting portion 211, the second signal conducting portion 212, the ground conducting portion 213, and the conductors 241 and 242 are connected to each other, so that the resonator 200 has an electrically-closed loop structure. The term "loop structure" may include, for example, a polygonal structure, such as a circular structure, a rectangular structure, and/or other types of structures. "Having a loop structure" may indicate being electrically-closed.

The capacitor 220 is inserted into an intermediate portion of the transmission line. For example, the capacitor 220 is inserted between the first signal conducting portion 211 and the second signal conducting portion 212. The capacitor 220 may include a shape of a lumped element, a distributed element, and/or other types of elements. For example, a distributed capacitor including the shape of the distributed element may include zigzagged conductor lines and a dielectric material including a relatively high permittivity between the zigzagged conductor lines.

In an example in which the capacitor 220 is inserted into the transmission line, the resonator 200 may include a property of a metamaterial. The metamaterial indicates a material including a predetermined electrical property that has not been discovered in nature, and thus, may include an artificially designed structure. An electromagnetic characteristic of all the materials existing in nature may include a unique magnetic permeability or a unique permittivity. Most materials may include a positive magnetic permeability or a positive permittivity. In the case of most materials, a right hand rule may be applied to an electric field, a magnetic field, and a Poynting vector, and thus, the corresponding materials may be referred to as right handed materials (RHMs). However, the metamaterial includes a magnetic permeability or a permittivity that may not be found in nature. Thus, the metamaterial may be classified as an epsilon negative (ENG) material, a mu negative (MNG) material, a double negative (DNG) material, a negative refractive index (NRI) material, a left-handed (LH) material, and/or other types of materials. The classification of the material may be based on a sign of the corresponding permittivity or magnetic permeability.

In an example in which a capacitance of the capacitor 220 inserted as the lumped element is appropriately determined, the resonator 200 may include the characteristic of a metamaterial. Because the resonator 200 may appropriately adjust the capacitance of the capacitor 220 to include a negative magnetic permeability, the resonator 200 may also be referred to as an MNG resonator. Various criteria may be applied to determine the capacitance of the capacitor 220. For example, the various criteria may include a criterion to enable the resonator 200 to include the characteristic of the metamaterial, a criterion to enable the resonator 200 to include a negative magnetic permeability in a target frequency, a criterion to enable the resonator 200 to include a zeroth order resonance characteristic in the target frequency, and/or other types of criteria. The capacitance of the capacitor 220 may be determined based on at least one of the various criteria.

The resonator 200, also referred to as the MNG resonator 200, may include a zeroth order resonance characteristic of including, as a resonance frequency, a frequency when a propagation constant is "0". Since the resonator 200 may include the zeroth order resonance characteristic, the resonance frequency may be independent of a physical size of the MNG resonator 200. By appropriately designing the capacitor 220, the MNG resonator 200 may sufficiently change the resonance frequency. Accordingly, the physical size of the MNG resonator 200 may not be changed.

In a near field, the electric field may be concentrated on the capacitor 220 inserted into the transmission line. Accordingly, due to the capacitor 220, the magnetic field may become dominant in the near field. The MNG resonator 200 may include a relatively high Q-factor using the capacitor 220 of the lumped element. Thus, an efficiency of power transmission may be enhanced. For example, the Q-factor may indicate a level of an ohmic loss or a ratio of a reactance to a resistance in wireless power transmission (WPT). The efficiency of the WPT may increase based on an increase in the Q-factor.

The MNG resonator 200 may include the matcher 230 that may be used in impedance matching. The matcher 230 may adjust a strength of a magnetic field of the MNG resonator 200. The matcher 230 may determine an impedance of the MNG resonator 200. A current may flow in or out the MNG resonator 200 via a connector. The connector may be connected to the ground conducting portion 213 or the matcher 230. Power may be transferred through coupling without using a physical connection between the connector and the ground conducting portion 213 or the matcher 230.

For example, as illustrated in FIG. 2, the matcher 230 is positioned within the loop formed by the loop structure of the resonator 200. The matcher 230 changes its physical shape to adjust the impedance of the resonator 200. In this example, the matcher 230 includes the conductor 231 to be used in the impedance matching in a location that is separated from the ground conducting portion 213 by a distance h. The impedance of the resonator 200 is changed by adjusting the distance h.

A controller (not shown) may control the matcher 230. In this example, the matcher 230 may change its physical shape based on a control signal generated by the controller. For example, the distance h between the conductor 231 and the ground conducting portion 213 may be increased or decreased based on the control signal. Accordingly, the physical shape of the matcher 230 may be changed to adjust the impedance of the resonator 200.

As illustrated in FIG. 2, the matcher 230 is configured to include a passive element, such as, for example, the conductor 231. In another example, the matcher 230 may be configured to include an active element, such as a diode, a transistor, and/or other types of circuit elements. In this example, the active element may be driven based on the control signal generated by the controller, and the impedance of the resonator 200 may be adjusted based on the control signal. For example, a diode that is a type of the active element, may be included in the matcher 230. The impedance of the resonator 200 may be adjusted depending on whether the diode is in an on state or in an off state.

Although not illustrated in FIG. 2, a magnetic core may be further provided to pass through the MNG resonator 200. The magnetic core may perform a function of increasing a power transmission distance.

Figure 3:
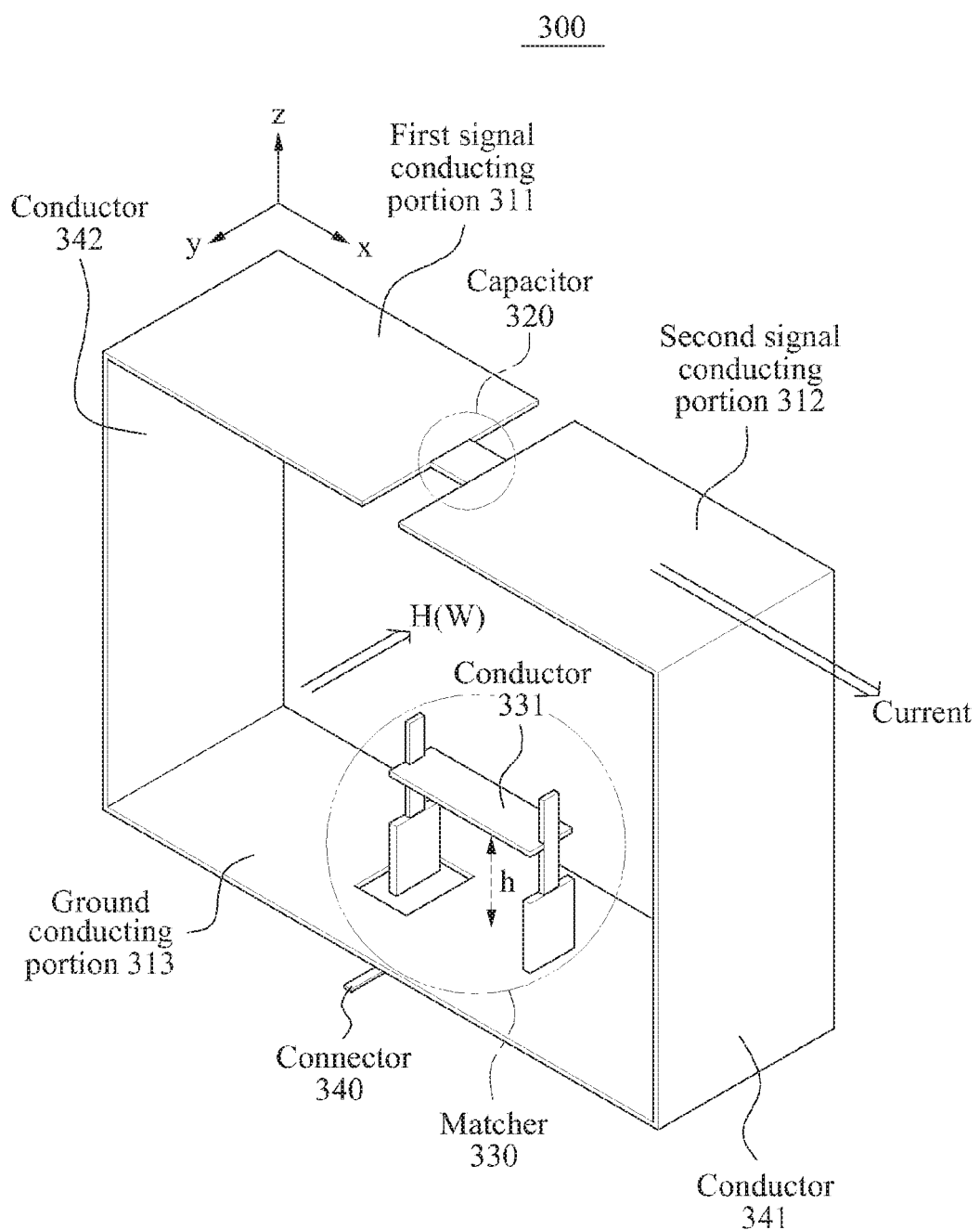

FIG. 3 illustrates an example of a resonator 300 including a three-dimensional (3D) structure. The resonator 300 includes a transmission line and a capacitor 320. The transmission line includes a first signal conducting portion 311, a second signal conducting portion 312, and a ground conducting portion 313. The capacitor 320 is inserted in series between the first signal conducting portion 311 and the second signal conducting portion 312, whereby an electric field is confined within the capacitor 320.

The transmission line includes the first signal conducting portion 311 and the second signal conducting portion 312 in an upper portion of the resonator 300, and includes the ground conducting portion 313 in a lower portion of the resonator 300. The first signal conducting portion 311 and the second signal conducting portion 312 face the ground conducting portion 313. A current flows in an x-direction through the first signal conducting portion 311 and the second signal conducting portion 312. Due to the current, a magnetic field H(W) may be formed in a −y direction. As another aspect (not shown), unlike the diagram of FIG. 3, the magnetic field H(W) may be formed in a +y direction.

One end of the first signal conducting portion 311 is shorted to a conductor 342, and another end of the first signal conducting portion 311 is connected to the capacitor 320. One end of the second signal conducting portion 312 is shorted to a conductor 341, and another end of the second signal conducting portion 312 is connected to the capacitor 320. Accordingly, the first signal conducting portion 311, the second signal conducting portion 312, the ground conducting portion 313, and the conductors 341 and 342 are connected to each other, and thus, the resonator 300 may include an electrically-closed loop structure.

As illustrated in FIG. 3, the capacitor 320 is inserted between the first signal conducting portion 311 and the second signal conducting portion 312. The capacitor 320 may include, for example, a shape of a lumped element, a distributed element, and/or other types of elements.

As the capacitor 320 is inserted into the transmission line, the resonator 300 may include a metamaterial property. As an example, when a capacitance of the capacitor inserted as the lumped element is appropriately determined, the resonator 300 may include the characteristic of the metamaterial. Since the resonator 300 may appropriately adjust the capacitance of the capacitor 320 to include a negative magnetic permeability, the resonator 300 may also be referred to as an MNG resonator. Various criteria may be applied to determine the capacitance of the capacitor 320. For example, the various criteria may include a criterion to enable the resonator 300 to include the characteristic of the metamaterial, a criterion to enable the resonator 300 to include a negative magnetic permeability in a target frequency, a criterion to enable the resonator 300 to include a zeroth order resonance characteristic in the target frequency, and/or other types of criteria. Based on at least one criterion among the various criteria, the capacitance of the capacitor 320 may be determined.

The resonator 300, also referred to as the MNG resonator 300, may include a zeroth order resonance characteristic of including, as a resonance frequency, a frequency when a propagation constant is "0". Since the resonator 300 may include the zeroth order resonance characteristic, the resonance frequency may be independent with respect to a physical size of the MNG resonator 300. Based on an appropriate design of the capacitor 320, the MNG resonator 300 may sufficiently change the resonance frequency. Accordingly, the physical size of the MNG resonator 300 may not be changed.

Referring to the MNG resonator 300, in a near field, the electric field may be concentrated on the capacitor 320 inserted into the transmission line. Accordingly, due to the capacitor 320, the magnetic field may become dominant in the near field. As another aspect, since the MNG resonator 300 including the zeroth-order resonance characteristic may include characteristics similar to a magnetic dipole, the magnetic field may become dominant in the near field. A relatively small amount of the electric field formed due to the insertion of the capacitor 320 may be concentrated on the capacitor 320, and thus, the magnetic field may become further dominant. The MNG resonator 300 may include a relatively high Q-factor using the capacitor 320 of the lumped element. Thus, enhancement of an efficiency of power transmission is possible.

Also, the MNG resonator 300 may include a matcher 330 that may be used in impedance matching. The matcher 330 may appropriately adjust a strength of the magnetic field of the MNG resonator 300. An impedance of the MNG resonator 300 may be determined by the matcher 330. Current may flow in or out the MNG resonator 300 via a connector 340. The connector 340 may be connected to the ground conducting portion 313 or the matcher 330.

For example, as illustrated in FIG. 3, the matcher 330 is positioned within the loop formed by the loop structure of the resonator 300. The matcher 330 changes its physical shape to adjust the impedance of the resonator 300. In this example, the matcher 330 includes a conductor 331 to be used in the impedance matching in a location separate from the ground conducting portion 313 by a distance h in a z-direction. The impedance of the resonator 300 is changed by adjusting the distance h.

Although not illustrated in FIG. 3, a controller may be provided to control the matcher 330. In this case, the matcher 330 may change its physical shape based on a control signal generated by the controller. For example, the distance h between the conductor 331 and the ground conducting portion 313 may be increased or decreased based on the control signal. Accordingly, the physical shape of the matcher 330 may be changed to adjust the impedance of the resonator 300. The distance h between the conductor 331 and the ground conducting portion 313 may be adjusted using a variety of schemes. As one example, a plurality of conductors may be included in the matcher 330, and the distance h may be adjusted by adaptively activating one of the conductors. As another example, the distance h may be adjusted by adjusting a physical location of the conductor 331 up or down. The distance h may be controlled based on the control signal of the controller. The controller may generate the control signal using various factors. An example of the controller generating the control signal is described later.

As illustrated in FIG. 3, the matcher 330 may be configured to include a passive element, such as, for example, the conductor 331. According to various examples, the matcher 330 may be configured to include an active element, such as a diode, a transistor, and/or other circuit elements. In this example, the active element may be driven based on the control signal generated by the controller, and the impedance of the resonator 300 may be adjusted based on the control signal. For example, a diode that is a type of the active element, may be included in the matcher 330. The impedance of the resonator 300 may be adjusted depending on whether the diode is in an on state or in an off state.

Although not illustrated in FIG. 3, a magnetic core may be further provided to pass through the resonator 300 configured as the MNG resonator. The magnetic core may increase a power transmission distance.

Figure 4:
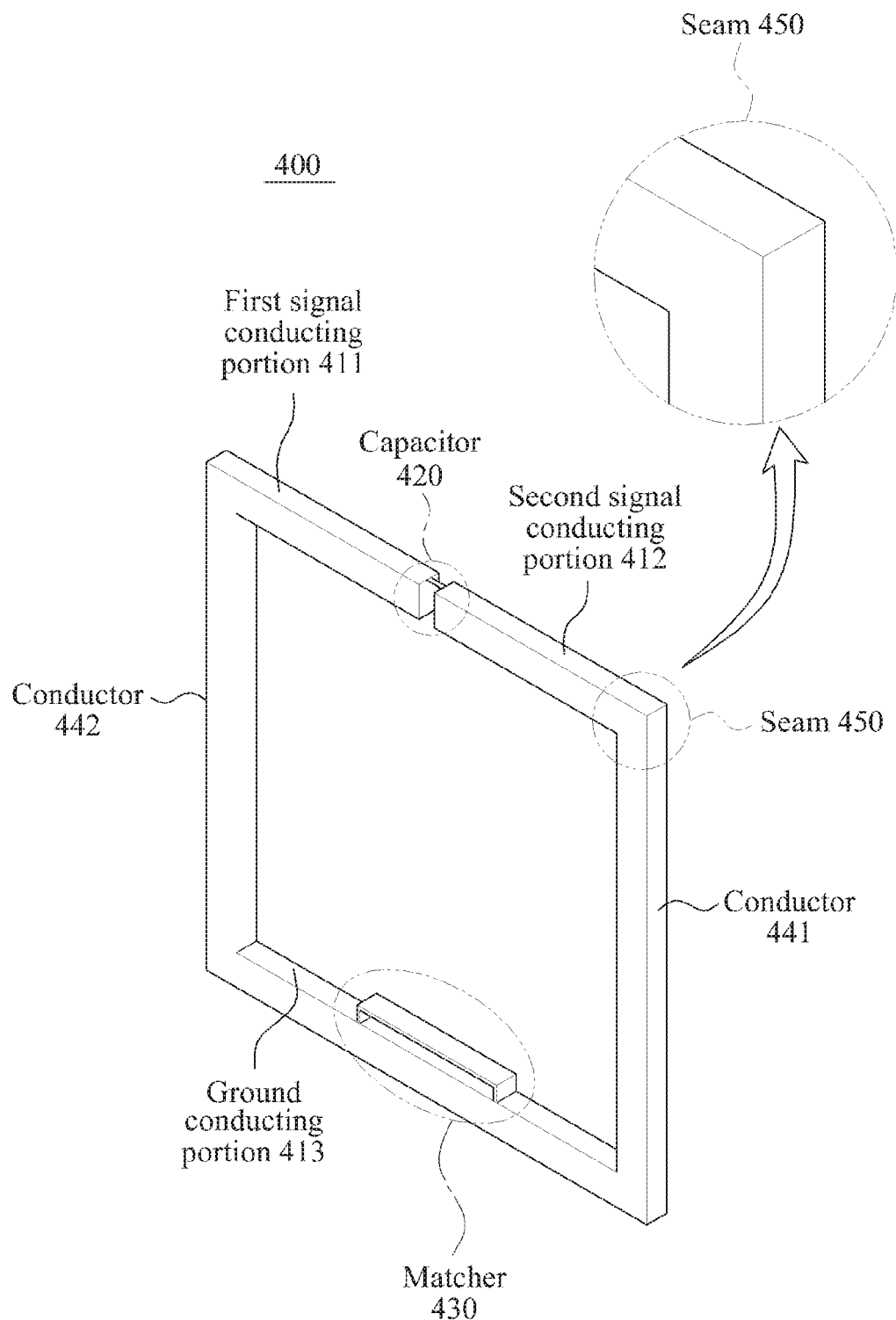

FIG. 4 illustrates an example of a bulky-type resonator 400 for WPT. The bulky-type resonator 400 includes a first signal conducting portion 411 and a conductor 442 that are integrally formed, instead of being separately manufactured and being connected to each other. Similarly, a second signal conducting portion 412 and a conductor 441 may also be integrally manufactured. The bulky-type resonator further includes the ground conducting portion 413 that is seamlessly and integrally manufactured with the first signal conducting portion 411 and the second signal conducting portion 412. A capacitor 420 is inserted in series between the first signal conducting portion 411 and the second signal conducting portion 412, and a matcher 430 is formed on the ground conducting portion 413.

In an example in which the second signal conducting portion 412 and the conductor 441 are separately manufactured and are connected to each other, a loss of conduction may occur due to a seam 450. Accordingly, the second signal conducting portion 412 and the conductor 441 are connected to each other without using a separate seam, so that the second signal conducting portion 412 and the conductor 441 are seamlessly connected to each other. Accordingly, the conductor loss caused by the seam 450 is decreased. A seamless connection connecting at least two partitions into an integrated form may be referred to as a bulky type.

Figure 5:
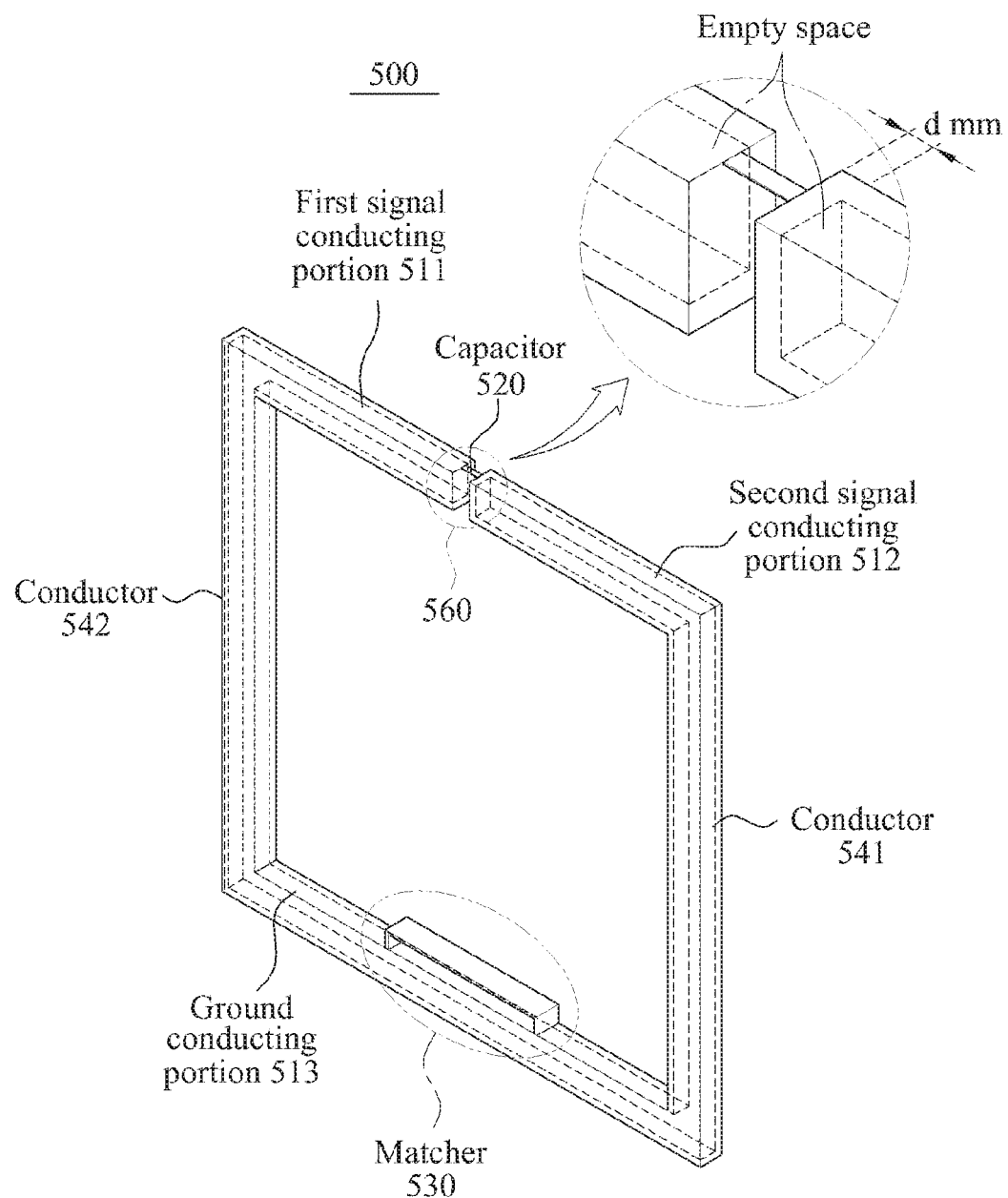

FIG. 5 illustrates an example of a hollow-type resonator 500 for WPT. In the hollow-type resonator 500, each of a first signal conducting portion 511, a second signal conducting portion 512, a ground conducting portion 513, and conductors 541 and 542 are configured as a hollow type, which includes an empty space inside. A capacitor 520 is inserted in series between the first signal conducting portion 511 and the second signal conducting portion 512, and a matcher 530 is formed on the ground conducting portion 513.

In a predetermined resonance frequency, an active current may flow in only a portion of the first signal conducting portion 511 instead of all of the first signal conducting portion 511, a portion of the second signal conducting portion 512 instead of all of the second signal conducting portion 512, a portion of the ground conducting portion 513 instead of all of the ground conducting portion 513, and portions of the conductors 541 and 542 instead of all of the conductors 541 and 542. In an example in which a depth of each of the first signal conducting portion 511, the second signal conducting portion 512, the ground conducting portion 513, and the conductors 541 and 542 is significantly deeper than a corresponding skin depth in the predetermined resonance frequency, the hollow-type resonator 500 may be ineffective. In addition, the significantly deeper depth may increase a weight and/or manufacturing costs of the resonator 500.

Accordingly, in the predetermined resonance frequency, the depth of each of the first signal conducting portion 511, the second signal conducting portion 512, the ground conducting portion 513, and the conductors 541 and 542 is appropriately determined based on the corresponding skin depth of each of the first signal conducting portion 511, the second signal conducting portion 512, the ground conducting portion 513, and the conductors 541 and 542, respectively. In an example in which each of the first signal conducting portion 511, the second signal conducting portion 512, the ground conducting portion 513, and the conductors 541 and 542 includes the appropriate depth deeper than a corresponding skin depth, the resonator 500 is manufactured to be lighter, and manufacturing costs of the resonator 500 decrease.

For example, as illustrated in a portion 560, the depth of the second signal conducting portion 512 is d mm, and d may be determined according to $$d = \frac{1}{\sqrt{\pi f \mu \sigma}}.$$

Here, f denotes a resonance frequency, $\mu$ denotes a magnetic permeability, and $\sigma$ denotes a conductor constant (e.g., conductivity), of the second signal conducting portion 512. In an example in which the first signal conducting portion 511, the second signal conducting portion 512, the ground conducting portion 513, and the conductors 541 and 542 are made of a copper and include a conductivity of $5.8 \times 10^7$ siemens per meter ($S \cdot m^{-1}$) and a magnetic permeability of $1.257 \times 10^{-6}$ henries per meter ($H \cdot m^{-1}$). A corresponding skin depth may be about 0.6 mm with respect to a resonance frequency of 10 kHz, and a corresponding skin depth may be about 0.006 mm with respect to a resonance frequency of 100 MHz.

Figure 6:
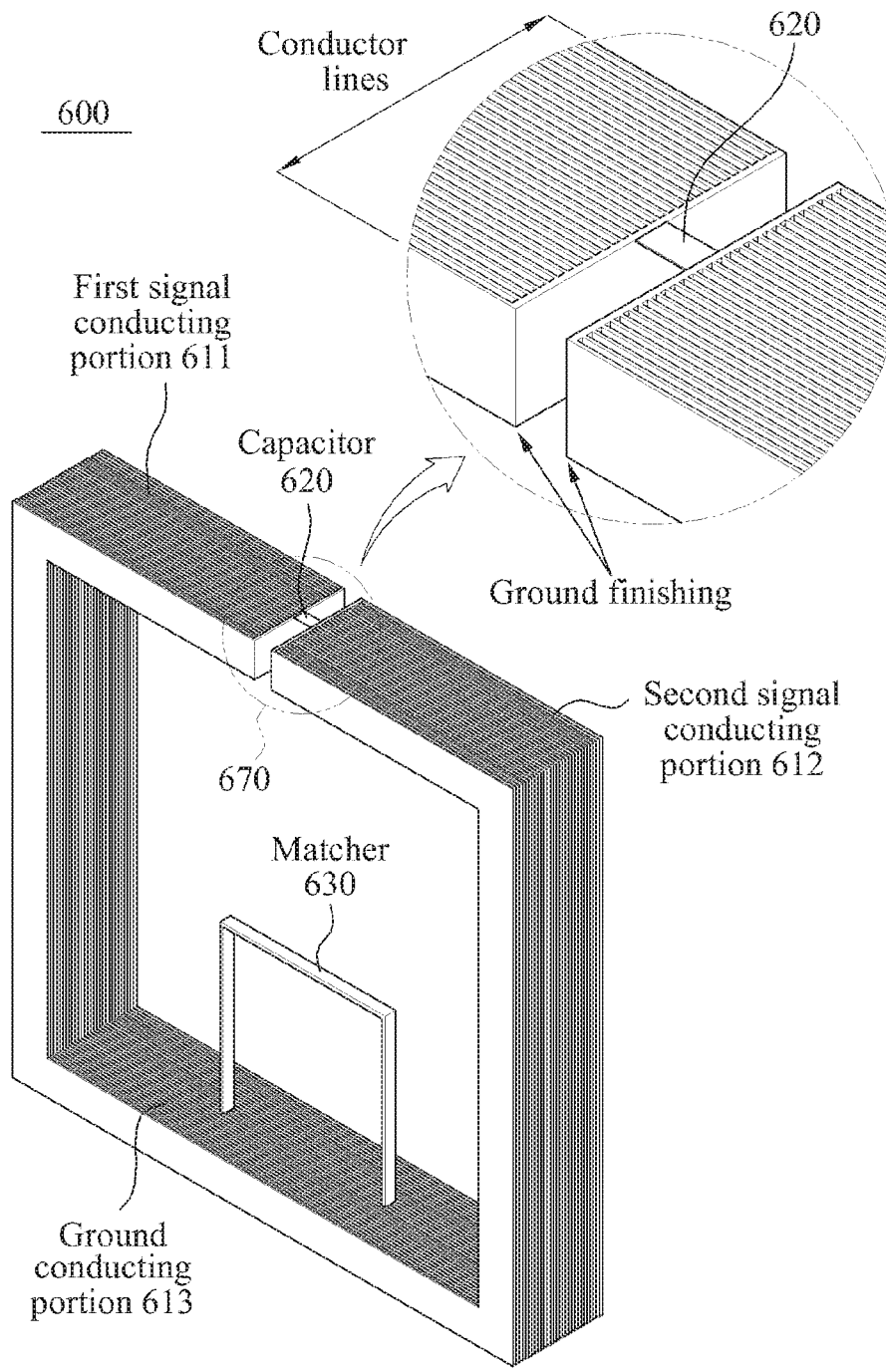

FIG. 6 illustrates an example of a resonator 600 for WPT using a parallel-sheet configuration. The parallel-sheet configuration is applied to each of a first signal conducting portion 611 and a second signal conducting portion 612 included in the resonator 600. The resonator 600 further includes a ground conducting portion 613 connected to the first signal conducting portion 611 and the second signal conducting portion 612, a capacitor 620 inserted in series between the first signal conducting portion 611 and the second signal conducting portion 612, and a matcher 630 formed on the ground conducting portion 613.

Each of the first signal conducting portion 611 and the second signal conducting portion 612 may not be a perfect conductor, and thus, may include a resistance. Due to the resistance, an ohmic loss may occur in the resonator 600. The ohmic loss may decrease a Q-factor and a coupling effect of the resonator 600.

By applying the parallel-sheet configuration to each of the first signal conducting portion 611 and the second signal conducting portion 612, the ohmic loss decreases, and the Q-factor and the coupling effect increases. Referring to a portion 670, in an example in which the parallel-sheet configuration is applied, each of the first signal conducting portion 611 and the second signal conducting portion 612 includes a plurality of conductor lines. The plurality of conductor lines are disposed in parallel, and are shorted at an end portion of each of the first signal conducting portion 611 and the second signal conducting portion 612.

Accordingly, a sum of resistances including the conductor lines decreases. Consequently, the ohmic loss decreases, and the Q-factor and the coupling effect increases.

FIG. 7 illustrates an example of a resonator 700 for WPT that includes a distributed capacitor 720. A capacitor as a lumped element may include a relatively high equivalent series resistance (ESR). An ohmic loss caused by the ESR may decrease a Q-factor and a coupling effect of a resonator. To decrease the ESR included in the capacitor as the lumped element, the capacitor 720 as a distributed element is used instead.

As illustrated in FIG. 7, the capacitor 720 includes a zigzagged structure. For example, the capacitor 720 includes a conductive line and a conductor including the zigzagged structure. Employing the capacitor 720 as the distributed element decreases the ohmic loss occurring due to the ESR.

In addition, by disposing a plurality of capacitors as lumped elements, the ohmic loss occurring due to the ESR may decrease. Since a resistance of each of the capacitors as the lumped elements decreases through a parallel connection, active resistances of the parallel-connected capacitors as the lumped elements may also decrease. Thus, the ohmic loss occurring due to the ESR may decrease. For example, employing ten capacitors of 1 pF instead of employing a single capacitor of 10 pF may decrease the ohmic loss occurring due to the ESR.

Figure 8A:
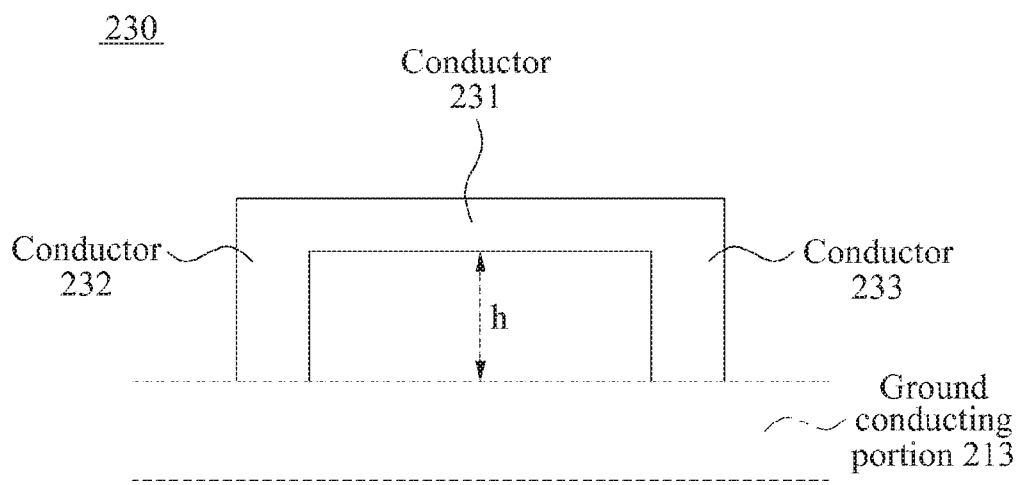
Figure 8B:
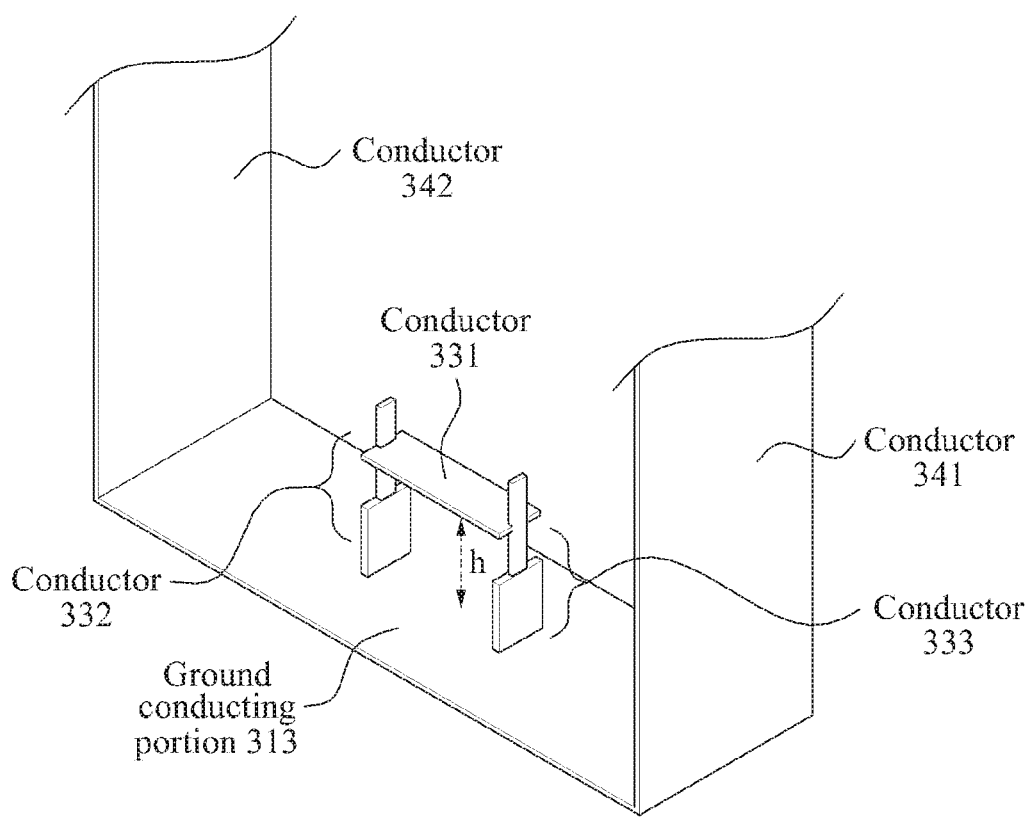

FIG. 8A illustrates an example of the matcher 230 used in the resonator 200 of FIG. 2, and FIG. 8B illustrates an example of the matcher 330 used in the resonator 300 of FIG. 3. As an aspect, FIG. 8A illustrates a portion of the resonator 200 including the matcher 230, and FIG. 8B illustrates a portion of the resonator 300 including the matcher 330.

Referring to FIG. 8A, the matcher 230 includes the conductor 231, a conductor 232, and a conductor 233. The conductors 232 and 233 are connected to the ground conducting portion 213 and the conductor 231. The impedance of the 2D resonator is determined based on a distance h between the conductor 231 and the ground conducting portion 213. The distance h between the conductor 231 and the ground conducting portion 213 may be controlled by the controller. The distance h between the conductor 231 and the ground conducting portion 213 may be adjusted using a variety of schemes. For example, the distance h may be adjusted by adaptively activating one of the conductors 231, 232, and 233, by adjusting the physical location of the conductor 231 up and down, and/or by other types of schemes.

Referring to FIG. 8B, the matcher 330 includes the conductor 331, a conductor 332, and a conductor 333. The conductors 332 and 333 are connected to the ground conducting portion 313 and the conductor 331. The impedance of the 3D resonator is determined based on a distance h between the conductor 331 and the ground conducting portion 313. The distance h between the conductor 331 and the ground conducting portion 313 may be controlled by the controller. Similar to the matcher 230, in the matcher 330, the distance h between the conductor 331 and the ground conducting portion 313 may be adjusted using a variety of schemes. For example, the distance h may be adjusted by adaptively activating one of the conductors 331, 332, and 333, by adjusting the physical location of the conductor 331 up and down, and/or by other types of schemes.

Although not illustrated in FIGS. 8A and 8B, the matcher may include an active element. A scheme of adjusting an impedance of a resonator using the active element, may be similar to the examples described above. For example, the impedance of the resonator may be adjusted by changing a path of a current flowing through the matcher using the active element.

Figure 9:
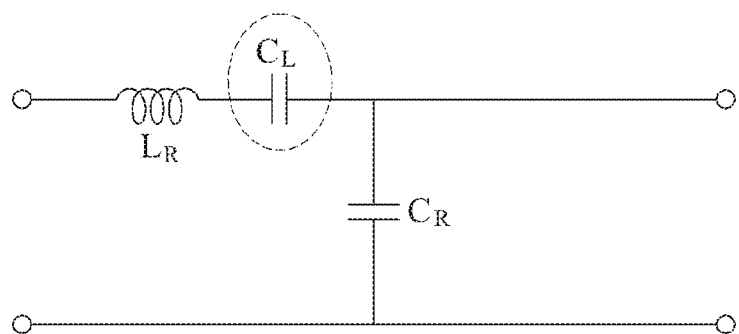
FIG. 9 is a diagram illustrating an example of an equivalent circuit of a resonator of FIG. 2.

FIG. 9 illustrates an example of an equivalent circuit of the resonator 200 for WPT of FIG. 2. That is, the resonator 200 of FIG. 2 may be modeled to the equivalent circuit of FIG. 9. In the equivalent circuit of FIG. 9, $C_L$ refers to a capacitor that is inserted in the form of a lumped element at approximately the middle of one of the transmission lines of FIG. 2.

In this example, the resonator 200 of FIG. 2 includes a zeroth resonance characteristic. For example, when a propagation constant is "0", the resonator 200 includes $\omega_{MZR}$ as a resonance frequency. The resonance frequency $\omega_{MZR}$ may be expressed by Equation 1.

$$\omega_{MZR} = \frac{1}{\sqrt{L_R C_L}} \quad \text{[Equation 1]}$$

In Equation 1, MZR denotes a Mu zero resonator. The capacitance $C_R$ of the resonator is negligible compared to the capacitance $C_L$ of the lumped element capacitor, so it is omitted from Equation 1. The resonance frequency $\omega_{MZR}$ of the resonator 200 of FIG. 2 depends on $L_R C_L$. A physical size of the resonator 200 of FIG. 2 and the resonance frequency $\omega_{MZR}$ may be independent of each other. Because the physical size and the resonance frequency are independent with respect to each other, the physical size may be sufficiently reduced.

Figure 10:
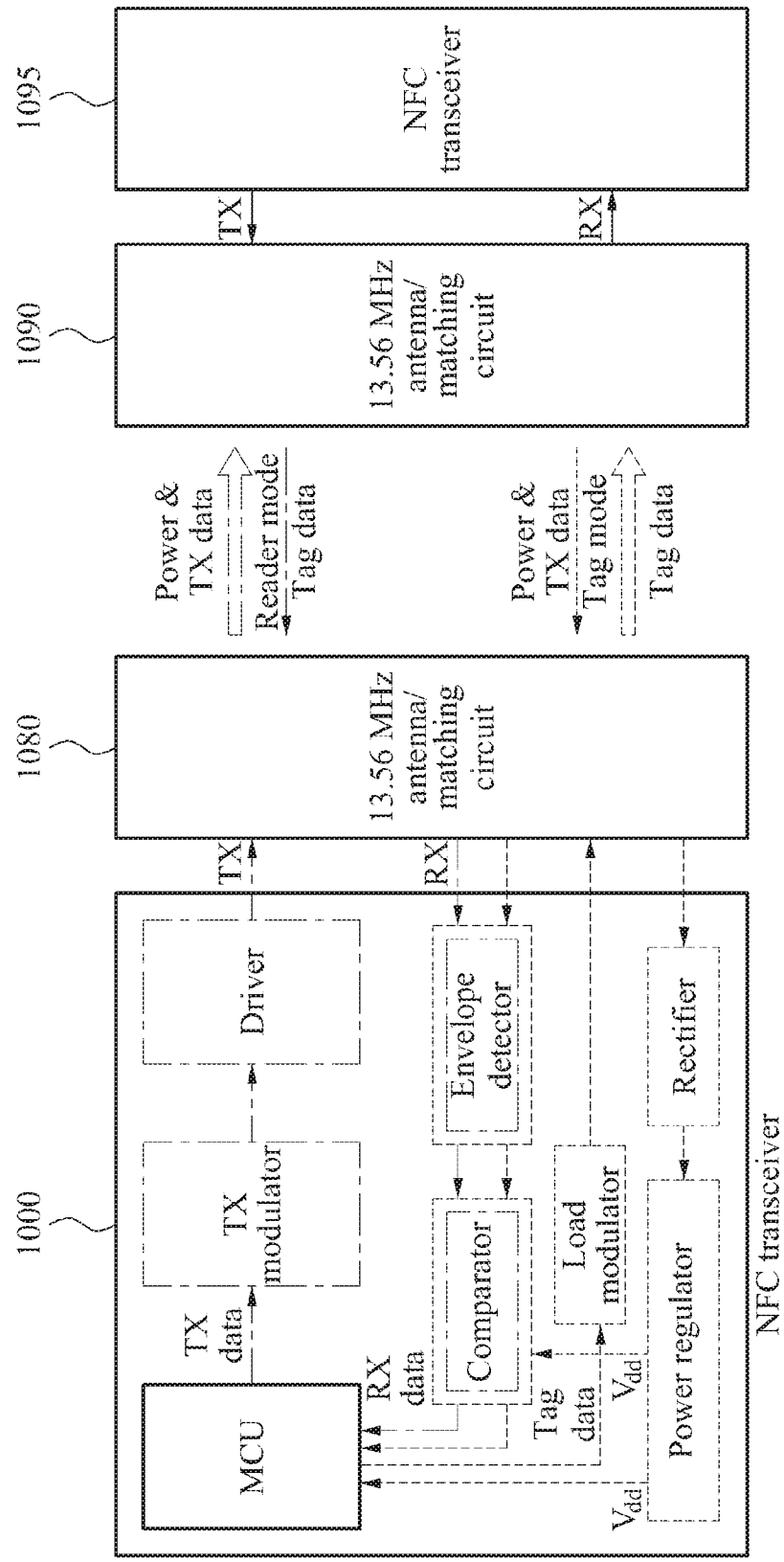
FIG. 10 is a block diagram illustrating an example of a near field communication (NFC) transceiver.

FIG. 10 illustrates an example of a near field communication (NFC) transceiver. Table 1 shows an example of a standard of NFC.

TABLE 1

| 18092 (NFC) | Passive | Active |
|---|---|---|
| Frequency | 13.56 MHz | |
| Reader to Tag Modulation | 100%, 8~30% Amplitude Shift Keying (ASK) modulation | |
| Reader to Tag Coding | Modified Miller | |
| Tag to Reader Data-rate | 106 kbps, 212 kbps, 424 kbps | |
| Sub-carrier | 847 kHz | |
| Tag to Reader Modulation | OOK | 100%, 8~30% ASK |
| Tag to Reader Coding | Manchester coding | Modified Miller |

In NFC, a reader system and a tag system may be simultaneously provided. In the NFC, a carrier frequency of 13.56 MHz may be used. Hereinafter, a reader mode and a tag mode of the NFC will be described.

FIG. 10 illustrates NFC transceivers 1000 and 1095. The NFC transceiver 1000 is connected to an antenna and matching circuit (antenna/matching circuit) 1080. The NFC transceiver 1000 transmits transmission (TX) data to the antenna/matching circuit 1080. The NFC transceiver 1000 receives reception (RX) data from the antenna/matching circuit 1080.

The NFC transceiver 1095 is connected to an antenna/matching circuit 1090. The NFC transceiver 1095 transmits TX data to the antenna/matching circuit 1090. The NFC transceiver 1095 receives RX data from the antenna/matching circuit 1090.

In a reader mode of the NFC transceiver 1000, a power and TX data is simultaneously transmitted from a reader, namely the NFC transceiver 1000 or the antenna/matching circuit 1080, to a tag, namely the NFC transceiver 1095 or the antenna/matching circuit 1090. For example, the reader may use, for example, an ASK modulator (e.g., a TX modulator and/or a load modulator) and/or a driver to transmit the power and the TX data.

Subsequently, the tag receives the power and the TX data, and recognizes the reader. The tag reflects a power using load modulation with a sub-carrier, and transmits tag data to the reader. The reader receives a signal, in which the tag data is loaded, and that is the reflected power, and demodulates the received signal to acquire the tag data.

In a tag mode of the NFC transceiver 1000, a reader, namely the NFC transceiver 1095 or the antenna/matching circuit 1090, transmits a signal in which a power and TX data are loaded. A tag, namely the NFC transceiver 1000 or the antenna/matching circuit 1080, receives the signal from the reader, rectifies the received signal using a rectifier, and generates a power or a voltage $V_{dd}$ (e.g., via a power regulator) that may be used by a microcontroller (MCU), a comparator, and/or other types of elements of the NFC transceiver 1000

Additionally, the tag demodulates the RX data in the received signal, using an envelope detector, and transmits the demodulated RX data to the MCU. When the reader is recognized, the MCU transmits a signal in which tag data is loaded, and enables load modulation to be performed, to transmit the tag data to the reader. The tag data may be used to convert a load.

Figure 11:
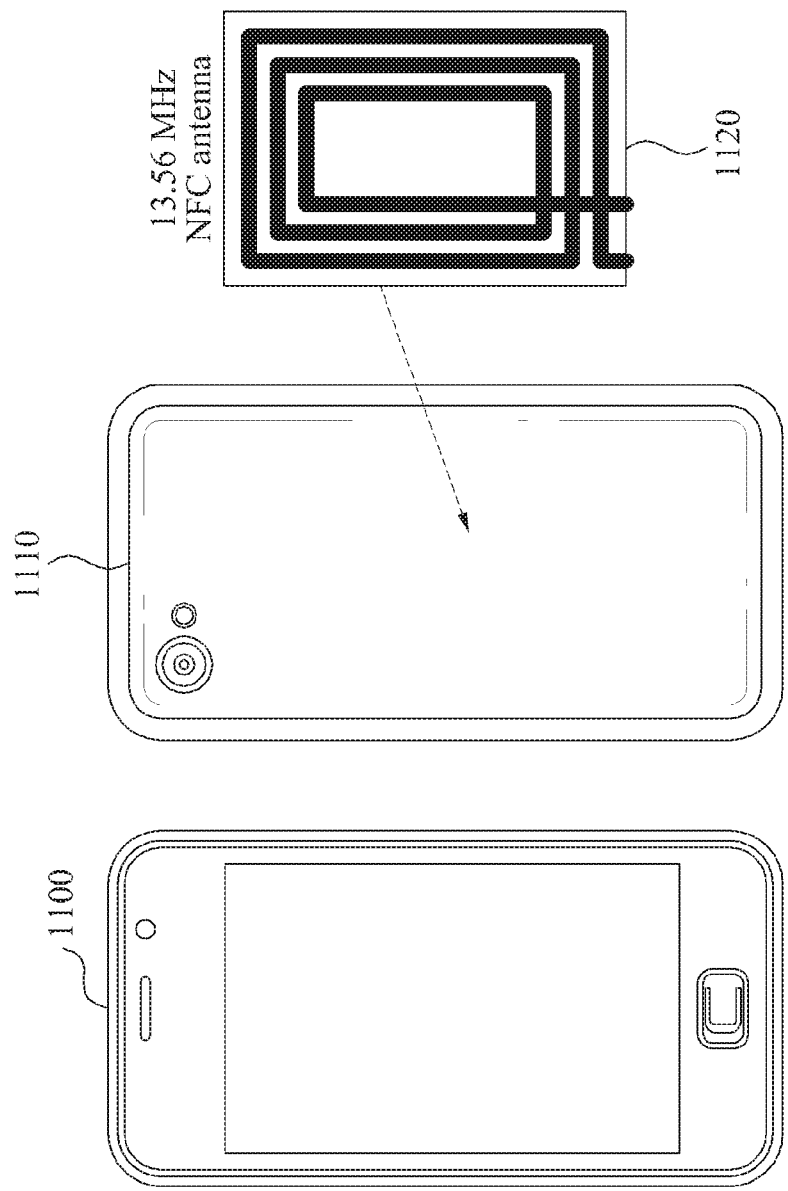
FIG. 11 is a diagram illustrating an example of a terminal including an NFC function.

FIG. 11 illustrates an example of a terminal including an NFC function. In NFC, a frequency of 13.56 MHz may be used. An NFC antenna 1120 is built in a back case 1110 of a terminal 1100, and covers the back of the terminal 1100.

In an example, a mobile device (e.g., the terminal 1100) may not include enough space to additionally include an WPT resonator for WPT. For example, when an WPT resonator operated in 13.56 MHz is inserted in the terminal 1100, a characteristic of each of the NFC antenna 1120 and the WPT resonator may be changed due to strong coupling formed between the NFC antenna 1120 and the WPT resonator. Accordingly, a sufficient distance between the NFC antenna 1120 and the WPT resonator may need to be ensured. However, the back case 1110 may not include enough space to ensure the sufficient distance between the NFC antenna 1120 and the WPT resonator.

Figure 12:
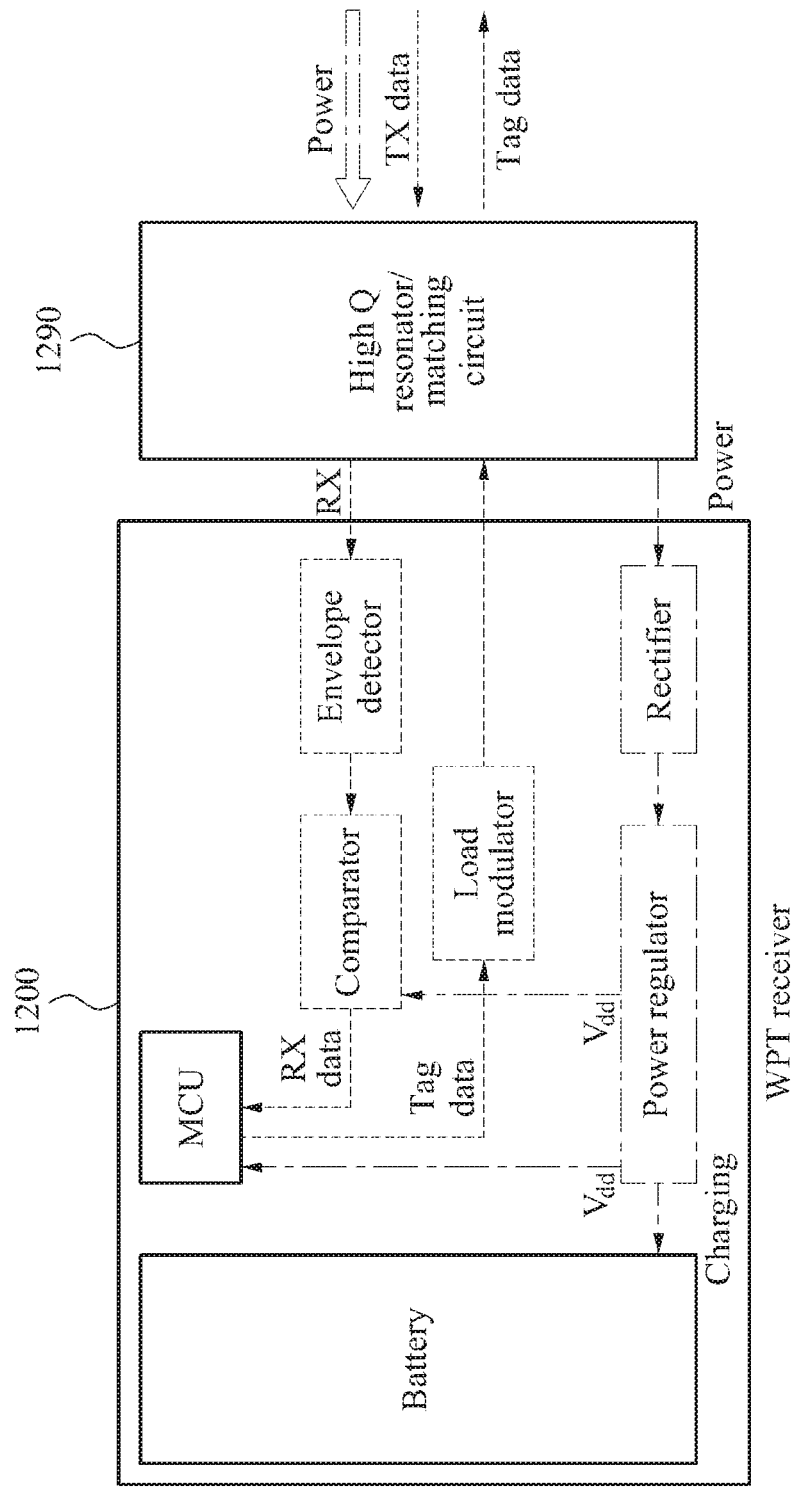
FIG. 12 is a block diagram illustrating an example of a wireless power transmission (WPT) receiver including an in-band communication function.

FIG. 12 illustrates an example of an WPT receiver 1200 for WPT that includes an in-band communication function. The WPT receiver 1200 is connected to a high-Q resonator and matching circuit (high Q resonator/matching circuit) 1290.

The WPT receiver 1200 receives, from the high Q resonator/matching circuit 1290, a power in which TX data is loaded. The power in which the TX data is loaded may be referred to as TX power.

The WPT receiver 1200 rectifies the received TX power using a rectifier. A power regulator, or a DC/DC converter (not illustrated), receives the rectified power, and supplies a power to operate the WPT receiver 1200, for example, a voltage $V_{dd}$ used to operate an MCU, a comparator, and/or other elements of the WPT receiver 1200. In addition, the supplied power charges a battery.

An envelope detector of the WPT receiver 1200 demodulates a partial signal of the received TX power to generate a RX data signal, and transfers the RX signal to the MCU. A signal in which tag data is loaded is transmitted through a load modulator.

As described above with reference to FIGS. 10 and 12, the structure for the tag mode of NFC is similar to the structure for WPT including in-band communication. The two structures may differ from each other in whether a battery is charged, and in a size or amount of a received power. Since the modulation and demodulation structure used for NFC is similar to the modulation and demodulation structure used for WPT, the modulation and demodulation structures may collide with each other, and may not be used simultaneously. Additionally, as described above with reference to FIG. 11, an WPT apparatus may also use a resonator disposed in the back case 1110 of the terminal 1100 (for example, the high Q resonator/matching circuit 1290).

To maintain a high efficiency, namely a high Q-factor, an WPT resonator may need to use as much space as possible in the back case 1110 of the terminal 1100. Additionally, to prevent coupling from being formed between the WPT resonator and the NFC antenna 1120 that use the same resonance frequency, both the WPT resonator and the NFC antenna 1120 may need to be disposed while maintaining a sufficient distance between the WPT resonator and the NFC antenna 1120. However, the back case 1110 may not include enough space to include both the NFC antenna 1120 and the WPT resonator.

To include both an NFC function and an WPT function, an apparatus, for example a mobile device, may employ an WPT system with the same resonance frequency of 13.56 MHz as the resonance frequency of an NFC system, due to a lack of space in which a resonator is to be inserted. Hereinafter, the terms "resonance frequency" and "operating frequency" may be used as interchangeable terms. Further, an NFC system and an WPT system including in-band communication may employ communication broadcasting using similar load modulation schemes. However, when similar operating frequencies, namely carrier frequencies, are used by the NFC system and the WPT system, the NFC system and the WPT system may not be simultaneously used. The NFC system and the WPT system may be selectively used by using a mode selection system and switches that will be described with reference to FIGS. 13 through 17.

In another example, when a resonance frequency of an WPT resonator is identical to a resonance frequency of an NFC resonator, a high-Q resonator for WPT may be commonly used as the NFC resonator. However, in an apparatus (e.g., a mobile device), a resonance frequency for WPT may be different from a resonance frequency for NFC. For example, in the WPT, a resonance frequency of 6.78 MHz may be used. In this example, the apparatus may include an independent WPT resonator for WPT, in addition to an NFC antenna. The WPT resonator may include, for example, a high-Q resonator for WPT. In the apparatus, the WPT resonator may be disposed in a predetermined space, and the NFC antenna may be disposed in a space other than the predetermined space. The NFC antenna may be disposed within or outside the WPT resonator. An apparatus and method of using an independent WPT resonator in addition to an NFC antenna will be further described with reference to FIGS. 18 through 21.

Figure 13:
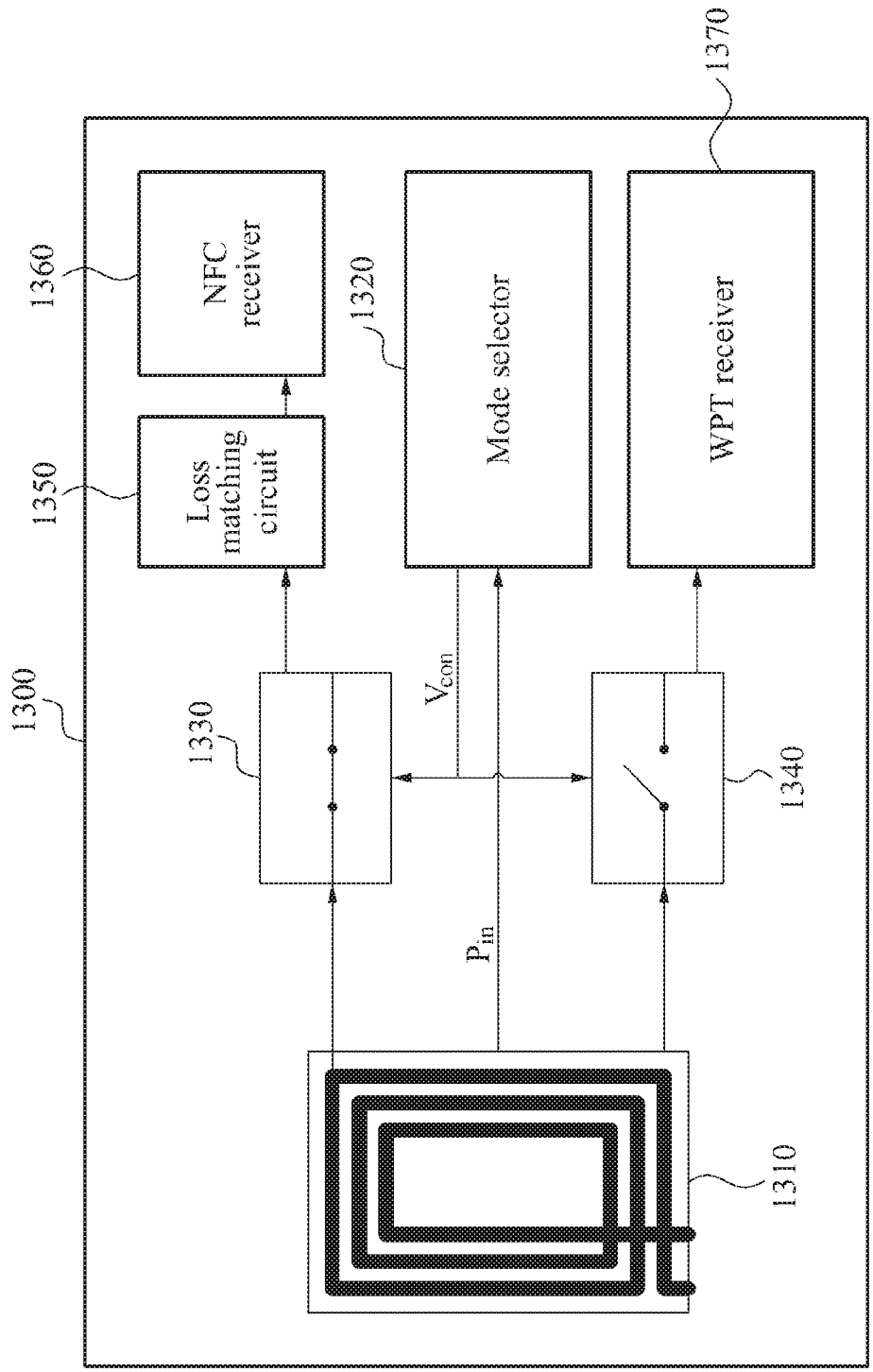
FIG. 13 is a diagram illustrating an example of an apparatus including an NFC function and an WPT function.

FIG. 13 illustrates an example of an apparatus 1300 including an NFC function and an WPT function. The apparatus 1300 includes an NFC apparatus and an WPT apparatus using the same resonance frequency as a resonance frequency for NFC.

In more detail, the apparatus 1300 includes a resonator 1310, a mode selector 1320, a first switch 1330, a second switch 1340, a loss matching circuit 1350, an NFC receiver 1360, and an WPT receiver 1370. The mode selector 1320 may be, for example, a mode selection system. The apparatus 1300 may be, for example, a mobile device or a wireless communication terminal.

The resonator 1310 is disposed in a case of the apparatus 1300, for example, a back case of the apparatus 1300. The resonator 1310 receives power.

The NFC receiver 1360 performs wireless communication using the received power. The NFC receiver 1360 may be, for example, the NFC transceiver 1000 or the NFC transceiver 1095 of FIG. 10.

The WPT receiver 1370 charges the apparatus 1300 using the received power. For example, the WPT receiver 1370 may charge a battery in the apparatus 1300 using the received power. The WPT receiver 1370 may be, for example, the WPT receiver 1200 of FIG. 12.

For example, when the WPT receiver 1370 uses a low-Q antenna for NFC, an efficiency of the WPT receiver 1370 may be significantly reduced. Accordingly, a high-Q resonator with high efficiency may be needed for wireless charging.

In an example, the WPT receiver 1370 may be, for example, an WPT system employing a resonance scheme using a resonance frequency of 13.56 MHz. In this example, the resonator 1310 may be a high-Q resonator, or an antenna, with the resonance frequency of 13.56 MHz. The high-Q resonator may refer to a resonator including a Q-factor exceeding 100.

Since the WPT receiver 1370 uses the high-Q resonator, WPT is achieved with a high efficiency. The high-Q resonator is used in common or shared by the WPT receiver 1370 and the NFC receiver 1360, namely, as an antenna of the NFC receiver 1360.

However, a signal of a sub-carrier of a frequency spaced apart by 847 kHz from 13.56 MHz may need to be transferred for NFC. Accordingly, NFC may need a low-Q resonator including a wide bandwidth.

To provide the above-described low-Q resonator, the loss matching circuit 1350 is used. The NFC receiver 1360 is connected to the resonator 1310 via the loss matching circuit 1350. The loss matching circuit 1350 provides loss matching using a resistor. The loss matching circuit 1350 may include lumped elements, for example, multilevel capacitors, inductors, and other types of lumped elements, and provides wideband matching.

Coupling between the loss matching circuit 1350 and the resonator 1310 provides a low Q-factor. For example, the loss matching circuit 1350 provides loss matching to enable the NFC receiver 1360 to enter a low-Q state. In other words, the NFC receiver 1360 may be in the low-Q state, through the loss matching provided by the loss matching circuit 1350.

The WPT receiver 1370 and the NFC receiver 1360 may perform tag-to-reader communication, using the same carrier frequency and the same load modulation. However, when the WPT receiver 1370 and the NFC receiver 1360 are simultaneously used, collision may occur between the WPT receiver 1370 and the NFC receiver 1360.

Accordingly, in the apparatus 1300, NFC performed by the NFC receiver 1360, and WPT performed by the WPT receiver 1370, may not be simultaneously achieved. The NFC and the WPT may need to be systematically separated from each other.

Hereinafter, a mode in which the NFC receiver 1360 of the apparatus 1300 is operated may be referred to as an "NFC mode". Additionally, a mode in which the WPT receiver 1370 of the apparatus 1300 is operated may be referred to as "WPT mode". The apparatus 1300 is operated in the NFC mode or the WPT mode. For example, when the apparatus 1300 is operated in the NFC mode, the NFC receiver 1360 is operated in a reader mode or a tag mode. In the reader mode, the NFC receiver 1360 functions as a reader, and in the tag mode, the NFC receiver 1360 functions as a tag.

To select an operating mode of the apparatus 1300, the mode selector 1320 connects the resonator 1310 to either the NFC receiver 1360 or the WPT receiver 1370. For example, the mode selector 1320 electrically or electronically connects the resonator 1310 to either the NFC receiver 1360 or the WPT receiver 1370.

The mode selector 1320 enables the resonator 1310 to be connected to one of the NFC receiver 1360 and the WPT receiver 1370, and to be disconnected from the other one.

The mode selector 1320 determines an operating mode of the apparatus 1300, for example, whether the apparatus 1300 is operated in the NFC mode or the WPT mode, and connects the resonator 1310 to either the NFC receiver 1360 or the WPT receiver 1370 based on the operating mode.

The first switch 1330 connects or disconnects the resonator 1310 to or from the NFC receiver 1360. The first switch 1330 is connected to the NFC receiver 1360 via the loss matching circuit 1350. In other words, the first switch 1330, the loss matching circuit 1350, and the NFC receiver 1360 is electrically or electronically connected. The second switch 1340 connects or disconnects the resonator 1310 to or from the WPT receiver 1370.

The mode selector 1320 controls the first switch 1330 and the second switch 1340 to connect the resonator 1310 to either the NFC receiver 1360 or the WPT receiver 1370. That is, the first switch 1330 and the second switch 1340 connects the resonator 1310 selectively to either the NFC receiver 1360 or the WPT receiver 1370.

The first switch 1330 and the second switch 1340 may be referred to as "mode selection switches". The first switch 1330 and the second switch 1340 may include, for example, single pole, double throw (SPDT) switches. In an example, when the apparatus 1300 is operated in the WPT mode, the first switch 1330 and the second switch 1340 may function as protection circuits, since the first switch 1330 and the second switch 1340 prevent high input power from being transferred to the NFC receiver 1360.

The mode selector 1320 outputs a switch control signal to each of the first switch 1330 and the second switch 1340, to control the first switch 1330 and the second switch 1340. The switch control signal may be, for example, a switch input signal. In one or more examples, $V_{con}$ may indicate the switch input signal.

The switch control signal may be an electrical signal or an electronic signal. Additionally, the switch control signal may correspond to 0 V or 3.3 V. A state in which the switch control signal corresponds to 0 V, may be referred to as an "initial state". Additionally, a state in which the switch control signal corresponds to 3.3 V, may be referred to as a "predetermined state" in which a predetermined condition is satisfied.

The first switch 1330 may be, for example, a p-type metal oxide semiconductor (PMOS) switch. The second switch 1340 may be, for example, an n-type MOS (NMOS) switch.

In the initial state, the first switch 1330 may enable the resonator 1310 to be shorted to the NFC receiver 1360. In the predetermined state, the second switch 1340 may enable the resonator 1310 to be shorted to the WPT receiver 1370.

Based on the switch control signal, one of the first switch 1330 and the second switch 1340 is turned on, and the other switch is turned off. Accordingly, the resonator 1310 is simultaneously shorted to the NFC receiver 1360 and the WPT receiver 1370.

The resonator 1310 outputs the received power to the mode selector 1320. The power output from the resonator 1310 may be referred to as "input power". In one or more examples, $P_{in}$ may indicate input power. The mode selector 1320 measures a level of the input power, and determines the switch control signal based on the measured level. The mode selector 1320 determines the switch control signal further based on a maximum output power of NFC.

In an example in which the input power is less than the maximum output power of NFC, the mode selector 1320 outputs the switch control signal to turn on the first switch 1330 and to turn off the second switch 1340, which enables the resonator 1310 to be shorted to the NFC receiver 1360.

In this example, the switch control signal may correspond to 0 V. In another example in which the input power is greater than the maximum output power of NFC, the mode selector 1320 outputs the switch control signal to turn off the first switch 1330 and to turn on the second switch 1340, which enables the resonator 1310 to be shorted to the WPT receiver 1370. In this example, the switch control signal may correspond to 3.3 V. For example, the maximum output power of NFC may be 1 W.

To charge a mobile device, power of, for example, about 2 W to about 3 W may be used. In this example, when the input power is greater than 1 W, the WPT receiver 1370 may use the input power to charge a battery.

In another example, when the NFC receiver 1360 is operated in the reader mode, power is not received via the resonator 1310. Since the input power $P_{in}$ input into the mode selector 1320 does not exist, a switch control signal of 0 V indicating the initial state may be output from the mode selector 1320, and the NFC mode may be automatically selected with respect to the apparatus 1300.

The apparatus 1300 may be operated in the NFC mode. When high input power is received, the NFC mode of the apparatus 1300 may be changed to the WPT mode. For example, the apparatus 1300 may be operated in the reader mode or the tag mode for NFC. In this example, the NFC mode of the apparatus 1300 may be changed to the WPT mode, only when high input power is received. Due to the change in the operating mode of the apparatus 1300, the high input power may be prevented from being transferred to the NFC receiver 1360, and the reader mode for NFC may be provided without a user's operation.

Figure 14:
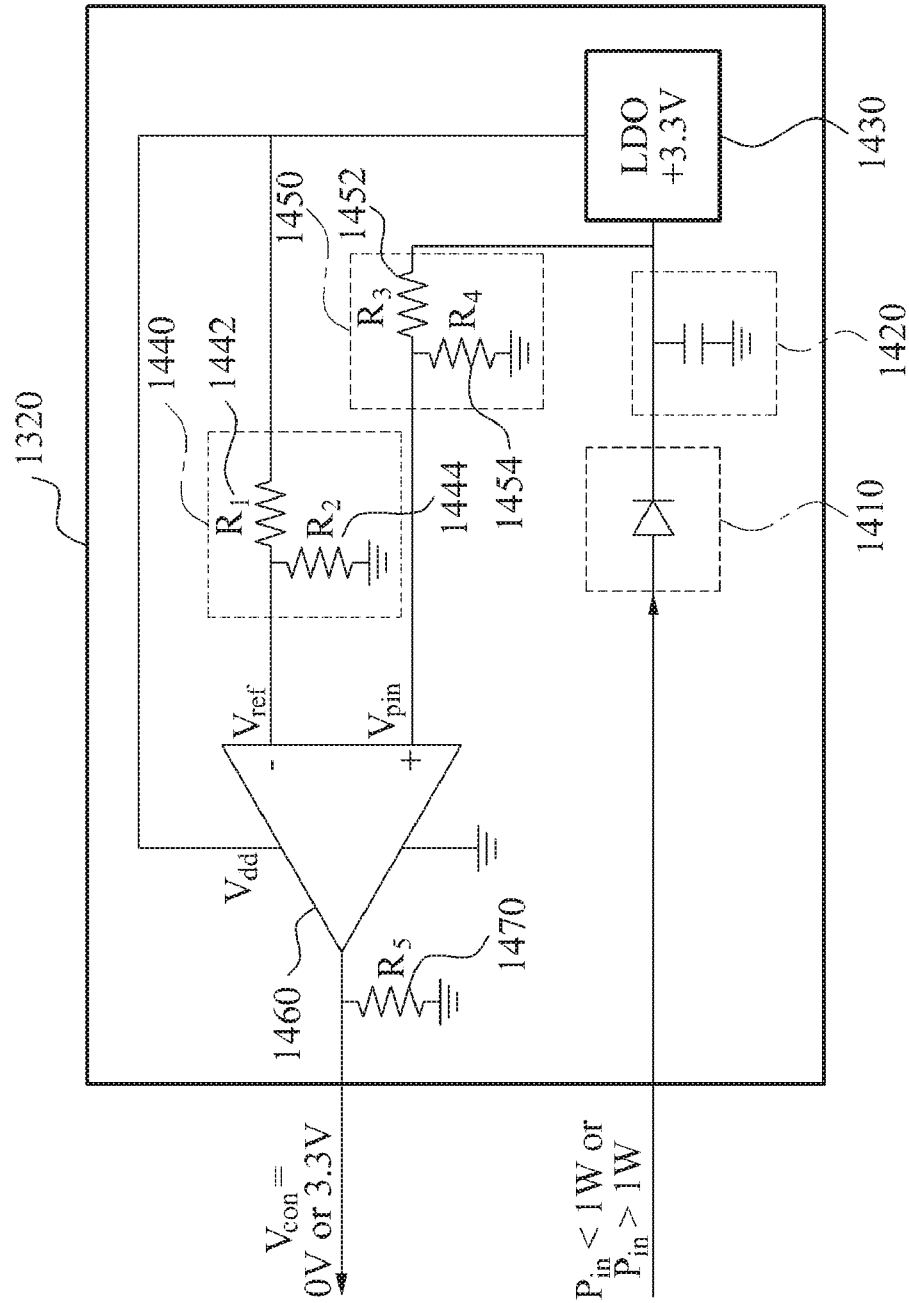
FIG. 14 is a diagram illustrating an example of a mode selector of the apparatus of FIG. 13.

FIG. 14 illustrates an example of the mode selector 1320 of FIG. 13. The mode selector 1320 includes a rectifier 1410, a capacitor 1420, a low dropout (LDO) 1430, a first voltage divider 1440, a second voltage divider 1450, a comparator 1460, and a fifth resistor 1470.

One end of the rectifier 1410 receives an input power. Another end of the rectifier 1410 is connected to the capacitor 1420.

One end of the capacitor 1420 is connected to the rectifier 1410 and the LDO 1430. Another end of the capacitor 1420 is connected to ground.

The capacitor 1420 is configured with the rectifier 1410 to shunt the input power, with the same structure as a structure of, for example, a power detector or a half-wave rectifier. In an example, the rectifier 1410 and the capacitor 1420 may form a power detector. The power detector may measure a level of the input power, and determine whether the input power is greater or less than 1 W indicating the maximum output power of NFC. In one or more examples, 1 W may be used to refer to the maximum output power of NFC. The power detector supplies a power voltage indicative of the input power.

The LDO 1430 receives the power voltage from the power detector, and supplies $V_{dd}$ and $V_{ref}$ (via the first voltage divider 1440) to the comparator 1460. In one or more examples, $V_{dd}$ may indicate an applied voltage, and $V_{ref}$ may indicate a voltage converted based on the maximum output power of NFC, e.g., 1 W. The LDO 1430 may supply a voltage of +3.3 V.

The second voltage divider 1450 converts a size or level of the power voltage to an appropriate value of $V_{pin}$. In one or more examples, $V_{pin}$ may indicate an input voltage.

The second voltage divider 1450 connects the capacitor 1420 and a positive terminal of the comparator 1460. Additionally, the second voltage divider 1450 is connected to the rectifier 1410 and to the LDO 1430.

The second voltage divider 1450 includes a third resistor 1452, and a fourth resistor 1454. One end of the third resistor 1452 is connected to the positive terminal of the comparator 1460, and to the fourth resistor 1454. Another end of the third resistor 1452 is connected to the capacitor 1420. Additionally, the another end of the third resistor 1452 is connected to the rectifier 1410 and to the LDO 1430. One end of the fourth resistor 1454 is connected to the positive terminal of the comparator 1460, and to the third resistor 1452. Another end of the fourth resistor 1454 is connected to the ground.

The first voltage divider 1440 converts $V_{dd}$ output from the LDO 1430 to $V_{ref}$. The first voltage divider 1440 connects the LDO 1430 and a negative terminal of the comparator 1460.

The first voltage divider 1440 includes a first resistor 1442 and a second resistor 1444. One end of the first resistor 1442 is connected to the negative terminal of the comparator 1460, and to the second resistor 1444. Another end of the first resistor 1442 is connected to the LDO 1430. One end of the second resistor 1444 is connected to the negative terminal of the comparator 1460, and to the first resistor 1442. Another end of the second resistor 1444 is connected to the ground.

The comparator 1460 determines whether the input power is greater or less than 1 W, and outputs a switch control signal. For example, the comparator 1460 compares $V_{pin}$ input via the positive terminal with $V_{ref}$ input via the negative terminal. In an example in which $V_{pin}$ is greater than $V_{ref}$, that is, in which the input power greater than 1 W is received, the comparator 1460 outputs the switch control signal of 3.3 V to connect the resonator 1310 of FIG. 13 to the WPT receiver 1370, via an output terminal. In another example in which $V_{pin}$ is less than $V_{ref}$, that is, in which the input power less than 1 W is received, the comparator 1460 outputs the switch control signal of 0 V to connect the resonator 1310 to the NFC receiver 1360, via the output terminal.

When a power source, namely the input power, does not exist, the comparator 1460 outputs the switch control signal of 0 V. For example, when the apparatus 1300 is operated in the reader mode for NFC, the comparator 1460 outputs the switch control signal of 0 V.

When the input power does not exist, that is, when the apparatus 1300 is operated in the reader mode for NFC, the fifth resistor 1470 acts as a ground connection to output the switch control signal of 0 V. The fifth resistor 1470 may include a resistance value of a few kiloohm (kΩ). One end of the fifth resistor 1470 is connected to the output terminal of the comparator 1460. Another end of the fifth resistor 1470 is connected to the ground. The mode selector 1320 may be configured in an analog manner, without using an additional digital element, for example, an MCU and other types of digital elements.

Figure 15:
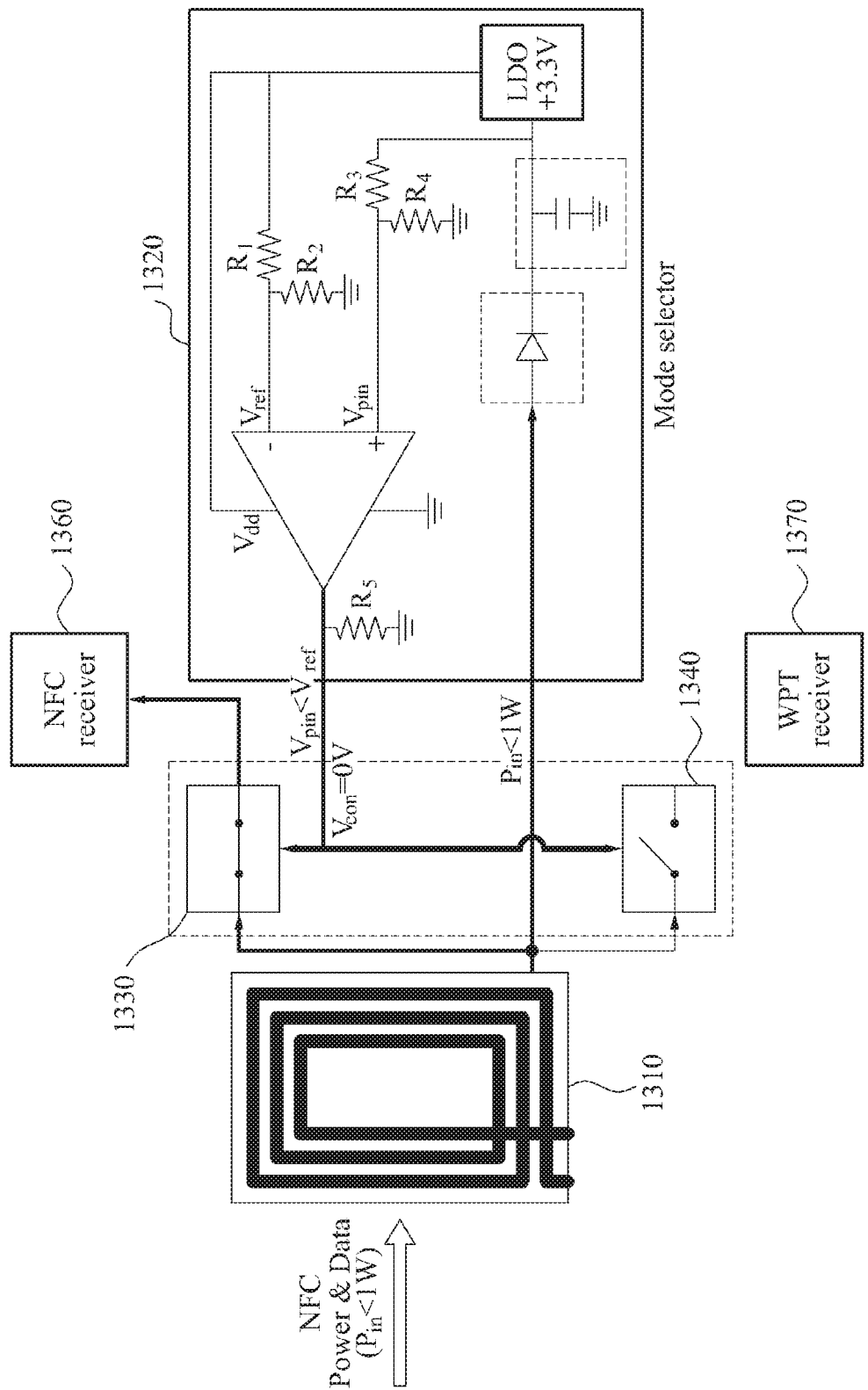
FIG. 15 is a diagram illustrating an example of an NFC mode.

FIG. 15 illustrates an example of an NFC mode of the apparatus 1300 of FIG. 13. For example, when the apparatus 1300 is operated in the tag mode for NFC, a size or level of an input power received via the resonator 1310 is less than 1 W. In this example, the mode selector 1320 outputs a switch control signal of 0 V.

By the switch control signal of 0 V, only the first switch 1330 is turned on, and the second switch 1340 is turned off. In other words, the switch control signal of 0 V enables only the NFC receiver 1360 to be shorted to the resonator 1310, and enables the WPT receiver 1370 to be disconnected from the resonator 1310. In this example, 1 W may indicate a maximum output power of NFC.

For example, when the apparatus 1300 is operated in the reader mode for NFC, no input power is received via the resonator 1310. In other words, power is not supplied to the mode selector 1320. In this example, by the fifth resistor (e.g., 1470 in FIG. 14) connected to the output terminal of the comparator (e.g., 1460), the signal output from the comparator is maintained at 0 V. Accordingly, the switch control signal of 0 V enables only the NFC receiver 1360 to be shorted to the resonator 1310, and enables the WPT receiver 1370 to be disconnected from the resonator 1310.

Figure 16:
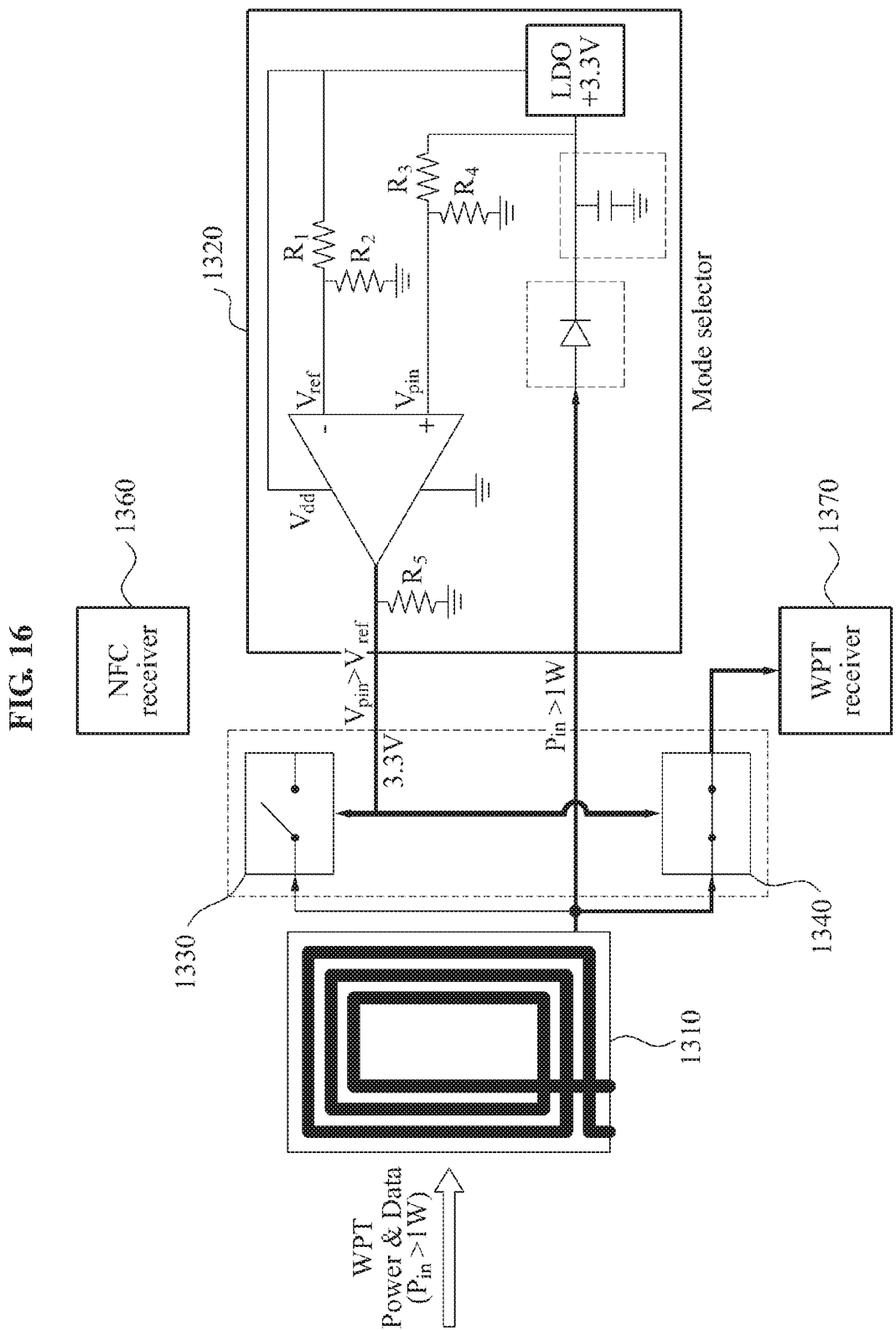
FIG. 16 is a diagram illustrating an example of an WPT mode.

FIG. 16 illustrates an example of an WPT mode of the apparatus 1300 of FIG. 13. For example, when the apparatus 1300 is operated in the WPT mode, a size or level of an input power received via the resonator 1310 is greater than 1 W. In this example, the mode selector 1320 outputs a switch control signal of 3.3 V.

By the switch control signal of 3.3 V, only the second switch 1340 is shorted, and the first switch 1330 is turned off. In other words, the switch power signal of 3.3 V enables only the WPT receiver 1370 to be shorted to the resonator 1310, and enables the NFC receiver 1360 to be disconnected from the resonator 1310.

Figure 17:
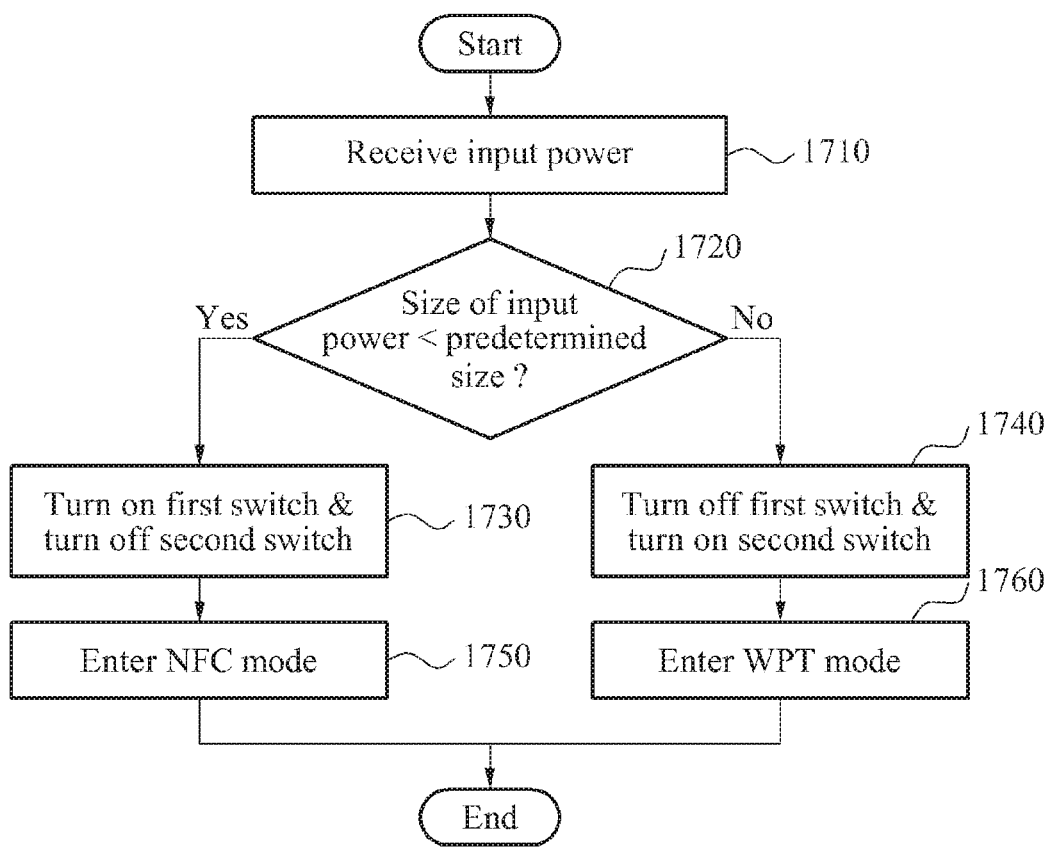
FIG. 17 is a flowchart illustrating an example of an operation method of a power receiving apparatus.

FIG. 17 illustrates an example of an operation method of a power receiving apparatus. The method of FIG. 17 may be performed, for example, by the apparatus 1300 of FIG. 13. At step 1710, the resonator 1310 receives an input power.

In steps 1720 through 1740, the resonator 1310 is connected to either the NFC receiver 1360 or the WPT receiver 1370, via the mode selector 1320, based on a size or level of the input power. At step 1720, the mode selector 1320 compares the size of the input power with a predetermined size or level. The predetermined size may be a size or level of a maximum output power of NFC, for example, 1 W.

When the size of the input power is less than the predetermined size, step 1730 is performed. When the size of the input power is greater than the predetermined size, step 1740 is performed.

At step 1730, the mode selector 1320 turns on the first switch 1330 and turns off the second switch 1340. At step 1740, the mode selector 1320 turns off the first switch 1330 and turns on the second switch 1340.

At step 1750, the apparatus 1300 enters an NFC mode in which the resonator 1310 is connected to the NFC receiver 1360. At step 1760, the apparatus 1300 enters an WPT mode in which the resonator 1310 is connected to the WPT receiver 1370. Technical information described above with reference to FIGS. 1 to 16 may be applied to the example of FIG. 17, and accordingly, further descriptions thereof will be omitted for conciseness.

Figure 18:
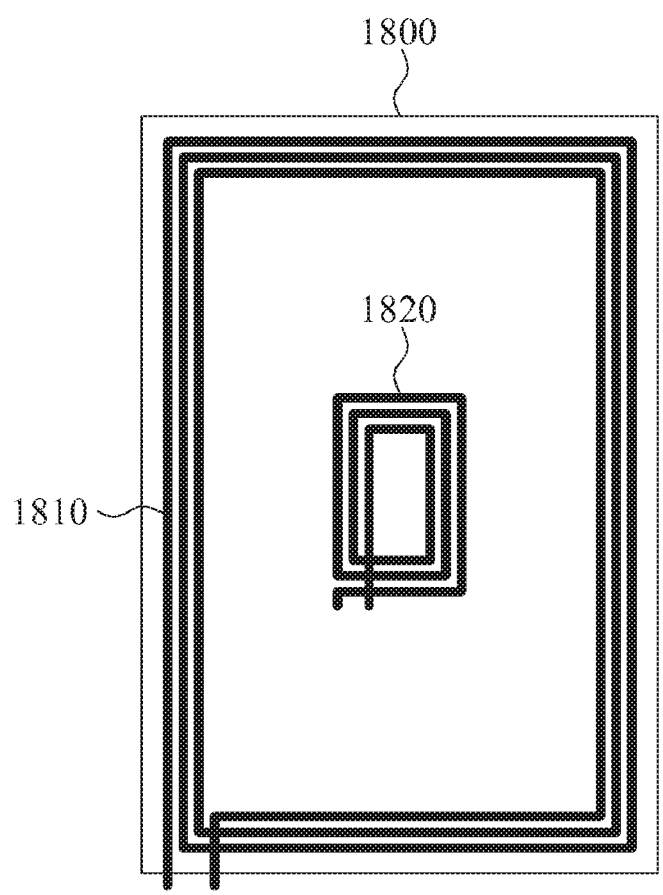
FIG. 18 is a diagram illustrating an example of an apparatus including an NFC resonator and an WPT resonator.

FIG. 18 illustrates an example of an apparatus 1800 including an NFC resonator 1820 and an WPT resonator 1810. A resonance frequency for WPT may be different from a resonance frequency for NFC. The WPT resonator 1810 may be, for example, a high-Q resonator for WPT using a resonance frequency of 6.78 MHz. The NFC resonator 1820 may be, for example, a low-Q resonator for NFC using a resonance frequency of 13.56 MHz. The WPT resonator 1810 may use a resonance frequency in an industrial, scientific, and medical (ISM) band, excluding the resonance frequency of the NFC resonator 1820.

First, the WPT resonator 1810 requiring the high-Q resonator occupies a wide space within the apparatus 1800. Subsequently, the NFC resonator 1820 with low-Q is disposed in an empty space other than the space occupied by the WPT resonator 1810. For example, the NFC resonator 1820 may be disposed above, below, or within the WPT resonator 1810. As illustrated in FIG. 18, the NFC resonator 1820 is disposed within the WPT resonator 1810.

Figure 19:
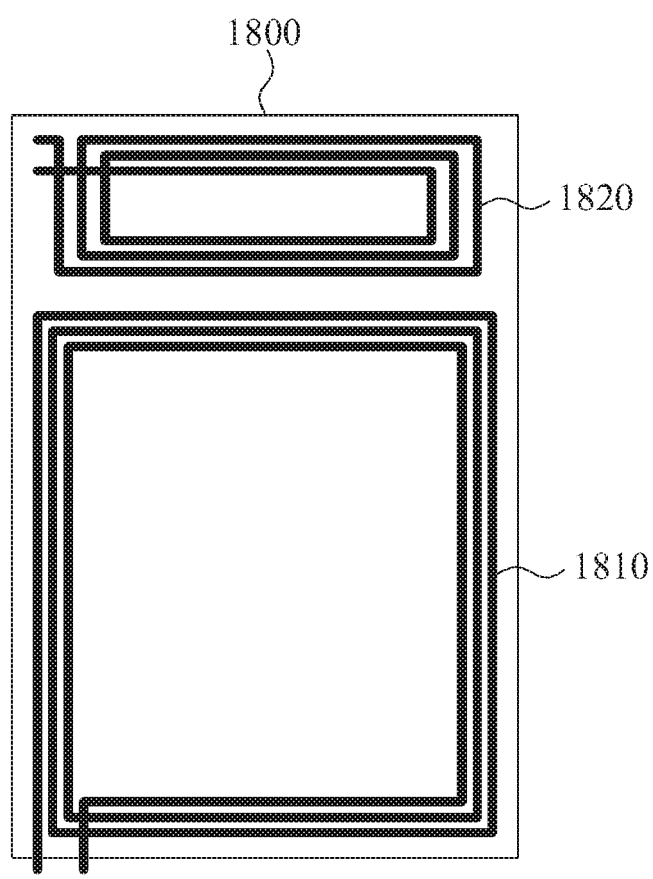
FIG. 19 is a diagram illustrating another example of an apparatus including an NFC resonator and an WPT resonator.

FIG. 19 illustrates another example of the apparatus 1800 including the NFC resonator 1820 and the WPT resonator 1810. As illustrated in FIG. 19, the NFC resonator 1820 is disposed above the WPT resonator 1810 within an interior space of the apparatus 1800.

Referring to FIGS. 18 and 19, the apparatus 1800 may further include the NFC receiver 1360 and the WPT receiver 1370 of FIG. 13. The WPT resonator 1810 may be connected to the WPT receiver 1370, and the NFC resonator 1820 may be connected to the NFC receiver 1360. The WPT receiver 1370 and the NFC receiver 1360 may be independently used.

For example, when an operating frequency of the NFC resonator 1820 is different from an operating frequency of the WPT resonator 1810, as described above with reference to FIGS. 18 and 19, each of the NFC resonator 1820 and the WPT resonator 1810 may be disposed within the apparatus 1800. Accordingly, an NFC system and an WPT system may be independently operated. In this example, the NFC system may include the NFC resonator 1820 and the NFC receiver 1360. Additionally, the WPT system may include the WPT resonator 1810 and the WPT receiver 1370.

Figure 20:
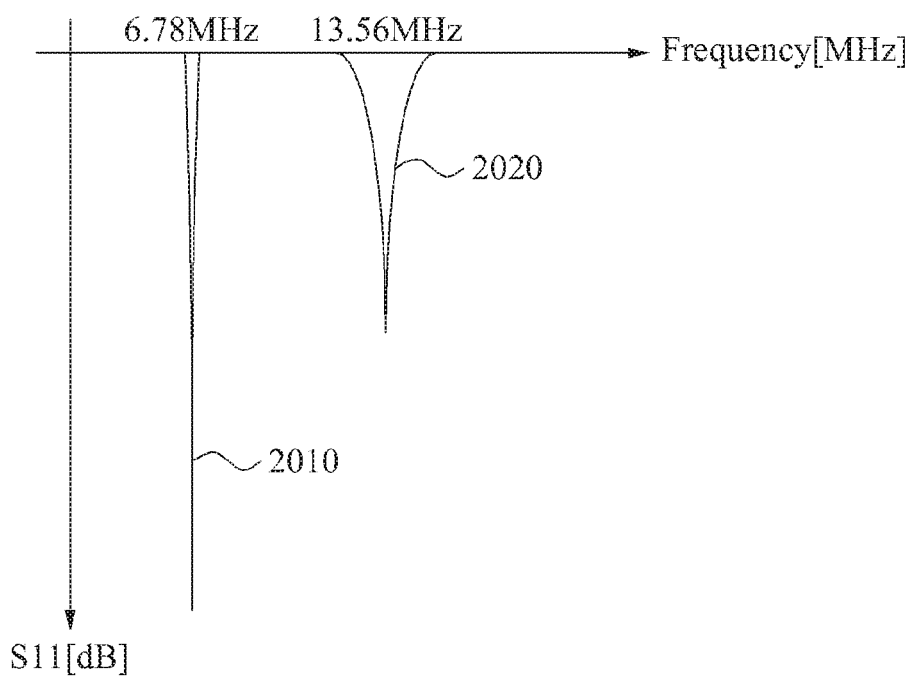
FIG. 20 is a graph illustrating an example of a resonance characteristic of each of an NFC resonator and an WPT resonator that use different resonance frequencies.

FIG. 20 illustrates an example of a resonance characteristic of each of an NFC resonator and an WPT resonator that use different resonance frequencies. In a graph of FIG. 20, an x-axis represents a frequency in MHz, and a y-axis represents S11 in decibel (dB). S11 may indicate an S11 frequency response. The graph of FIG. 20 illustrates a resonance characteristic 2010 of the WPT resonator 1810 using a resonance frequency of 13.56 MHz, and a resonance characteristic 2020 of the NFC resonator 1820 using a resonance frequency of 6.78 MHz.

For example, when two resonators generate resonance using an inductance L and a lumped capacitance C of a coil of each of the two resonators, coupling may not be formed between the two resonators, despite the two resonators approaching each other. In this example, different resonance frequencies may be used by the two resonators.

In this example, the frequencies of the two resonators may hardly be changed, even when the two resonators are disposed close to each other. Accordingly, each of the WPT resonator 1810 and the NFC resonator 1820 exhibits the different resonance characteristics 2010 and 2020, respectively, as illustrated in the graph of FIG. 20.

Figure 21:
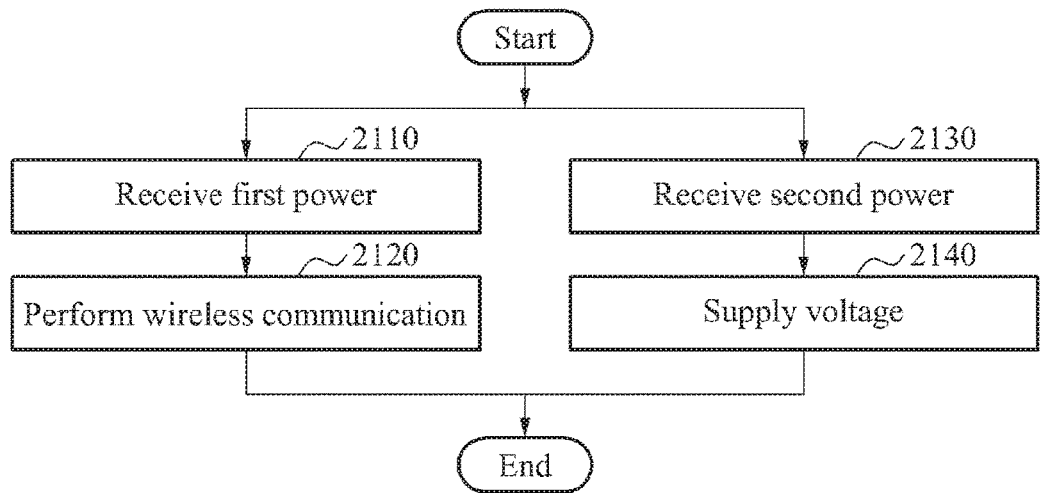
FIG. 21 is a flowchart illustrating another example of an operation method of a power receiving apparatus.

FIG. 21 illustrates another example of an operation method of a power receiving apparatus. The method of FIG. 21 may be performed, for example, by the apparatus 1300 of FIG. 13, and the apparatus 1800 of FIG. 18. At step 2110, the NFC resonator 1820 receives a first power. At step 2120, the NFC receiver 1360 performs wireless communication using the received first power.

At step 2130, the WPT resonator 1810 receives a second power. At step 2140, the WPT receiver 1370 supplies a voltage using the received second power. The voltage may be used to operate the apparatus 1800.

A resonance frequency of the NFC resonator 1820 may be different from a resonance frequency of the WPT resonator 1810. In the apparatus 1800, the NFC resonator 1820 may be disposed within the WPT resonator 1810.

Technical information described above with reference to FIGS. 1 to 20 may be applied to the example of FIG. 21, and accordingly, further descriptions thereof will be omitted for conciseness. The first power and/or the second power may refer to an input power.

The examples described above with reference to FIGS. 1 to 21 may be used to add an WPT system to an apparatus including an NFC system, and may also be applied to an WPT system configured to perform out-band communication. The WPT system configured to perform out-band communication may also use an WPT resonator configured as shown in FIG. 13, by using the above-described mode selection switches.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power receiving apparatus comprising:
   a resonator configured to receive a power and to output the power;
   a near field communication (NFC) transceiver configured to perform wireless communication using the power output by the resonator;
   a wireless power transmission (WPT) receiver configured to supply a voltage using the power output by the resonator;
   a connecting unit configured to selectively connect the resonator to either the NFC transceiver or the WPT receiver;
   a mode selector configured to control the connecting unit to selectively connect the resonator to either the NFC transceiver or the WPT receiver based on the power output by the resonator; and
   an antenna/matching circuit configured to be connected to the NFC transceiver,
   wherein the NFC transceiver transmits transmission (TX) data to the antenna/matching circuit and receives reception (RX) data from the antenna/matching circuit.

2. The power receiving apparatus of claim 1, wherein the power receiving apparatus is configured to operate on the voltage.

3. The power receiving apparatus of claim 1, wherein the resonator has a resonance frequency of 13.56 megahertz (MHz), and a Q-factor exceeding 100.

4. The power receiving apparatus of claim 1, further comprising:
   a loss matching circuit connected between the NFC transceiver and the connecting unit, and configured to perform loss matching to enable the NFC transceiver to enter a low-Q state.

5. The power receiving apparatus of claim 1, wherein the mode selector is further configured to:
   determine an operating mode of the power receiving apparatus based on the power output by the resonator; and
   control the connecting unit to selectively connect the resonator to either the NFC transceiver or the WPT receiver based on the operating mode.

6. The power receiving apparatus of claim 1, wherein the mode selector is further configured to:
   control the connecting unit to connect the resonator to the NFC transceiver when the power output by the resonator is less than a maximum NFC output power; and
   control the connecting unit to connect the resonator to the WPT receiver when the power output by the resonator is greater than the maximum NFC output power.

7. The power receiving apparatus of claim 1, wherein:
   the connecting unit comprises
   a first switch configured to selectively connect and disconnect the resonator to and from the NFC transceiver, and a second switch configured to selectively connect and disconnect the resonator to and from the WPT receiver; and the mode selector is further configured to control the first switch and the second switch to selectively connect the resonator to either the NFC transceiver or the WPT receiver.

8. The power receiving apparatus of claim 7, wherein the mode selector is further configured to output a switch control signal to the first switch and the second switch to selectively turn the first switch on and the second switch off, or to turn the first switch off and the second switch on.

9. The power receiving apparatus of claim 8, wherein the mode selector is further configured to:

generate the switch control signal to turn the first switch on to connect the resonator to the NFC transceiver and to turn the second switch off to disconnect the resonator from the WPT receiver when the power output by the resonator is less than a maximum NFC output power; and generate the switch control signal to turn the first switch off to disconnect the resonator from the NFC transceiver and to turn the second switch on to connect the resonator to the WPT receiver when the power output by the resonator is greater than the maximum NFC output power.

10. The power receiving apparatus of claim 1, wherein the mode selector comprises:

a rectifier and a capacitor configured to receive the power output by the resonator and to supply a power voltage indicative of the power output by the resonator;

a low dropout (LDO) regulator configured to supply a predetermined applied voltage; and a comparator configured to
  compare the power voltage with the applied voltage,
  output a switch control signal to control the connecting unit to connect the resonator to the NFC transceiver when the power voltage is less than the applied voltage, and
  output the switch control signal to control the connecting unit to connect the resonator to the WPT receiver when the power voltage is greater than the applied voltage.

11. The power receiving apparatus of claim 10, wherein:
the comparator comprises a negative input terminal and a positive input terminal; and
the mode selector further comprises
  a first voltage divider configured to divide the applied voltage to generate a reference voltage indicative of a maximum NFC output power, and to supply the reference voltage to the negative input terminal of the comparator; and
  a second voltage divider configured to divide the power voltage to generate an input voltage indicative of the power output by the resonator, and to supply the input voltage to the positive input terminal of the comparator.

12. The power receiving apparatus of claim 10, wherein:
the comparator comprises an output terminal configured to output the switch control signal; and
the mode selector further comprises a resistor connected to ground and to the output terminal of the comparator.

13. A method of operating a power receiving apparatus, comprising:
  connecting a resonator to either a near field communication (NFC) transceiver or a wireless power transmission (WPT) receiver based on a power received by the resonator;
  using the NFC transceiver to perform wireless communication using the power when the resonator is connected to the NFC transceiver; and
  using the WPT receiver to supplying a voltage using the power when the resonator is connected to the WPT receiver.

14. The method of claim 13, wherein the connecting comprises:
  comparing the power with a predetermined power;
  connecting the resonator to the NFC transceiver and disconnecting the resonator from the WPT receiver when the power is less than the predetermined power; and
  disconnecting the resonator from the NFC transceiver and connecting the resonator to the WPT receiver when the power is greater than the predetermined power.

15. A non-transitory computer-readable storage medium storing a program comprising instructions to cause a computer to implement the method of claim 13.

16. A power receiving apparatus comprising:
  a near field communication (NFC) resonator configured to receive a first power and output the first power;
  an NFC transceiver configured to perform wireless communication using the first power output by the NFC resonator;
  a wireless power transmission (WPT) resonator configured to receive a second power and output the second power;
  an WPT receiver configured to supply a voltage using the second power output by the WPT resonator; and,
  an antenna/matching circuit configured to be connected to the NFC transceiver,
  wherein a resonance frequency of the NFC resonator is different from a resonance frequency of the WPT resonator,
  wherein the NFC transceiver transmits transmission (TX) data to the antenna/matching circuit and receives reception (RX) data from the antenna/matching circuit.

17. The power receiving apparatus of claim 16, wherein the power receiving apparatus is configured to operate on the voltage.

18. The power receiving apparatus of claim 16, wherein the NFC resonator is disposed within the WPT resonator.

19. A method of operating a power receiving apparatus, comprising:
  using a near field communication (NFC) transceiver to perform wireless communication using a first power received by an NFC resonator; and
  using a wireless power transmission (WPT) receiver to supply a voltage using a second power received by a WPT resonator,
  wherein a resonance frequency of the NFC resonator is different from a resonance frequency of the WPT resonator.

20. The method of claim 19, wherein the NFC resonator is disposed within the WPT resonator.

* * * * *